United States Patent
Imai et al.

[11] Patent Number: 5,818,436
[45] Date of Patent: Oct. 6, 1998

[54] APPARATUS AND METHOD FOR PLAYING BACK CONTINUOUS DATA

[75] Inventors: Toru Imai, Kanagawa-ken; Hiroshi Mizoguchi, Tokyo; Koji Yamaguchi, Chiba-ken; Hisako Tanaka, Kanagawa-ken, all of Japan

[73] Assignee: Kabushiki Kaisha Toshiba, Kawasaki, Japan

[21] Appl. No.: 833,467

[22] Filed: Apr. 7, 1997

Related U.S. Application Data

[63] Continuation of Ser. No. 212,848, Mar. 15, 1994, abandoned.

[30] Foreign Application Priority Data

Mar. 15, 1993 [JP] Japan ................................ 5-053471
Dec. 24, 1993 [JP] Japan ................................ 5-327326

[51] Int. Cl.⁶ .................................................. G06F 17/60
[52] U.S. Cl. .................................................. 345/302
[58] Field of Search .......................... 360/4; 345/302, 345/330, 333, 339, 418

[56] References Cited

U.S. PATENT DOCUMENTS

| | | | |
|---|---|---|---|
| 3,827,079 | 7/1974 | Bolick, Jr. et al. | 360/79 |
| 4,425,586 | 1/1984 | Miller | 386/117 |
| 4,445,187 | 4/1984 | Best | 463/31 |
| 4,483,599 | 11/1984 | MacRae et al. | 352/22 |
| 4,786,980 | 11/1988 | Sonobe et al. | 386/131 |
| 4,841,387 | 6/1989 | Rindfuss | 360/72.1 |
| 4,868,687 | 9/1989 | Penn et al. | 360/13 |
| 4,884,972 | 12/1989 | Gasper | 434/185 |
| 4,905,094 | 2/1990 | Pocock et al. | 386/106 |
| 4,924,387 | 5/1990 | Jeppesen | 705/8 |
| 4,931,950 | 6/1990 | Isle et al. | 395/11 |
| 4,937,807 | 6/1990 | Weitz et al. | 369/85 |
| 5,065,345 | 11/1991 | Knowles et al. | 345/302 |
| 5,109,482 | 4/1992 | Bohrman | 345/328 |
| 5,119,363 | 6/1992 | Satoh et al. | 369/275.3 |
| 5,237,648 | 8/1993 | Mills et al. | 345/433 |
| 5,272,571 | 12/1993 | Henderson et al. | 360/4 |
| 5,363,482 | 11/1994 | Victor et al. | 345/346 |
| 5,388,197 | 2/1995 | Rayner | 345/328 |
| 5,428,774 | 6/1995 | Takahashi et al. | 707/101 |
| 5,430,835 | 7/1995 | Williams et al. | 345/302 |
| 5,440,677 | 8/1995 | Case et al. | 345/302 |
| 5,500,936 | 3/1996 | Allen et al. | 345/348 |
| 5,526,407 | 6/1996 | Russell et al. | 379/89 |
| 5,535,063 | 7/1996 | Lamming | 360/4 |

FOREIGN PATENT DOCUMENTS

| | | |
|---|---|---|
| 0 495612 | 7/1992 | European Pat. Off. |
| 3-236089 | 10/1991 | Japan |
| WO 89/11693 | 11/1989 | WIPO |

*Primary Examiner*—Anton Fetting
*Attorney, Agent, or Firm*—Oblon, Spivak, McClelland, Maier & Neustadt, P.C.

[57] ABSTRACT

An apparatus and a method for playing back selectively a desired part of continuous data by using an input event as a clue. The apparatus comprises: first storage means for storing continuous data sequentially inputted; second storage means for storing a plurality of input events occurring at arbitrary times during the continuous data sequence; third storage means for storing data enabling identity of addresses a in the first storage means of locations in the continuous data sequence respectively corresponding to the input events; specifying means for specifying one of the input events stored in the second storage means; and playback means for playing back a selected portion of the continuous data stored in the first storage means in accordance with the identifying data stored in the third storage means which corresponds to the input event specified through the specifying means.

24 Claims, 32 Drawing Sheets

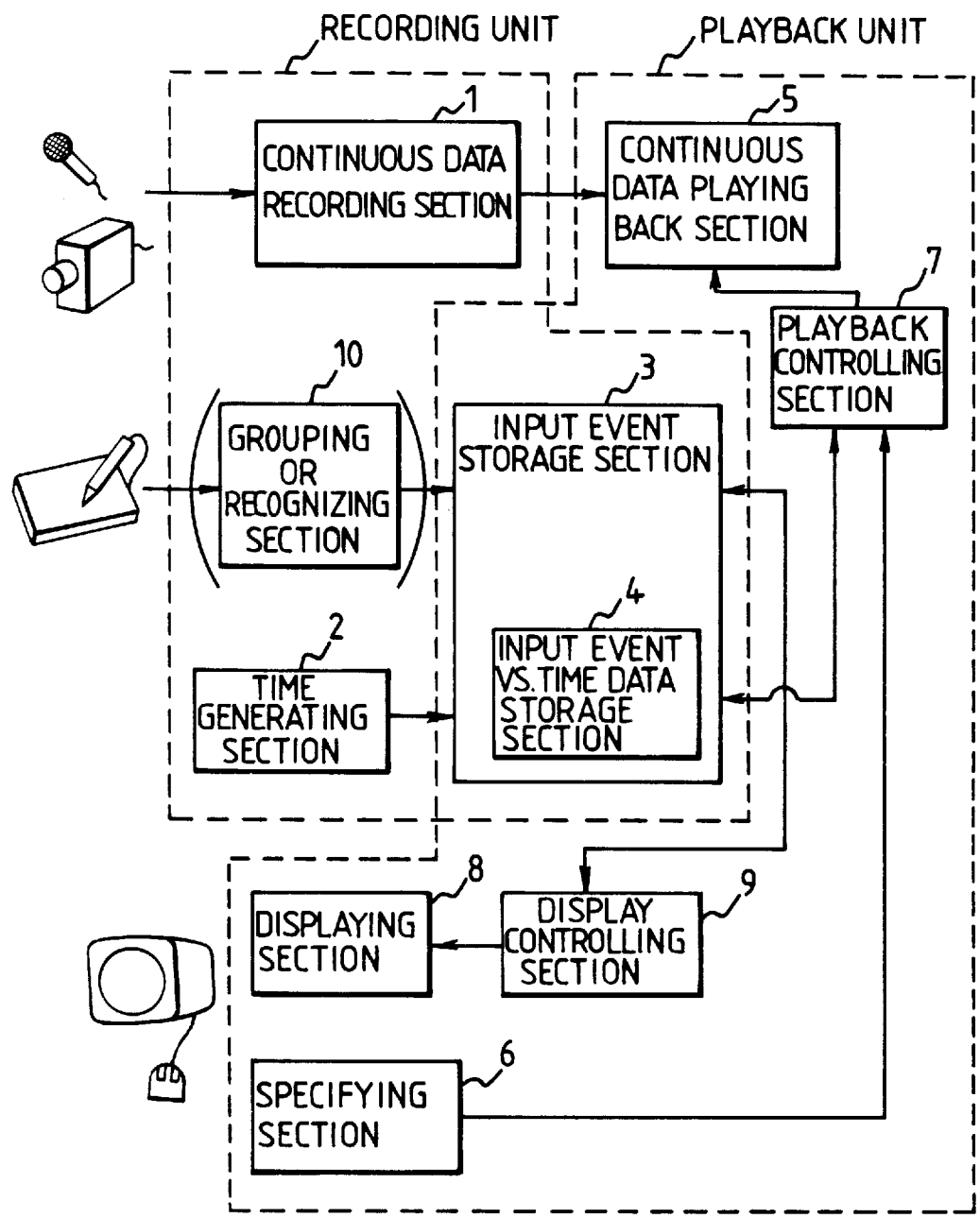
F I G. 1

PLAYBACK PERIOD IS FIXED TO $T_W$

FIRST TABLE (a)

(b)

APPARATUS AND METHOD FOR PLAYING BACK CONTINUOUS DATA

This application is a continuation of application Ser. No. 08/212,848, filed on Mar. 15, 1994, now abandoned.

BACKGROUND OF THE INVENTION

1. Field of the Invention

The present invention relates to an apparatus and a method for playing back continuous data in a system including a computer.

2. Description of the Related Art

Conventionally, the following methods have been proposed for recording scenes in which one person or a plurality of persons talk, such as a meeting, lecture, conversation over telephones and the like (hereinafter generally referred to as a "conference").

One method, which does not relate to a computer system, is to record sound/pictures all during the conference or to dictate the whole conference. Although this method is advantageous in that information pertaining to the conference can be recorded to the smallest details, it has a problem that desired information cannot be selected immediately.

Another method is to record the conference by taking notes of its main points. While this method is advantageous in that one can take a quick look at the record and know an outline of the conference, it has a problem that because the notes are limited, it is difficult to play back details of the conference. Especially, because such information as nuances, atmosphere, tone, development of a talk and the like is almost impossible to be described by characters and figures, it is insufficient to take notes to understand the details of the conference later. Further, because a selection of contents to be described is put into the hands of a note taker, this method has another problem that an important point may be missed or a undesired point may be selected. Furthermore, there is such an inconvenience that when a participant of the conference takes notes, he/she is obliged to focus in taking the notes, distracting his/her mind from participating in the conference.

Not only in the conference, there has existed no means in general for taking a quick look at recorded sound/picture data in playing them back, so that a necessary part cannot be selectively played back. Data such as sound/pictures data (hereinafter generally referred to as "continuous data") comprises signals which change with time such as audio and video signals. Due to that, there exists a problem that the whole record has to be played back from the beginning or the necessary part has to be found while the whole record is played back fast.

Thus, conventionally, it has been difficult to readily select a desired part to be played back from continuous data which have more detailed information.

SUMMARY OF THE INVENTION

It is an object of the present invention to provide an apparatus and a method for playing back selectively a desired part of continuous data by using an input event as a clue.

Here, such inputs as executed by a user to a system having an ability of processing data (i.e. a computer) correspond to an "input event" referred to with respect to the present invention.

In accordance with the present invention there is provided an apparatus comprises first storage means for storing first data including a continuous sequence of data; second storage means for storing second data including a plurality of input events occurring at arbitrary times during the continuous data sequence; third storage means for storing third data corresponding to each of the input events, the third data being representative of addresses in the first storage means of locations in the continuous data sequence respectively corresponding to the input events; specifying means for specifying one of the input events stored in the second storage means; and playback means, responsive to the specifying means, for playing back a selected portion of the continuous data stored in the first storage means in accordance with the third data corresponding to the input event specified through the specifying means.

Further in accordance with the present invention, there is provided a method for playing back continuous data. The method comprises the steps of storing continuous data sequentially inputted; storing, during the storing of the continuous data, a plurality of input events occurring at arbitrary times during the continuous data sequence and data representative of storage addresses in the continuous data which has been inputted corresponding to the input events; specifying one of the stored input events; and playing back a selected portion of the stored continuous data in accordance with the data representative of storage addresses which corresponds to the specified input event.

Further in accordance with the present invention, there is provided a method for playing back continuous data. The method comprises the steps of playing continuous data stored previously; storing, during the playing of the continuous data, a plurality of input events occurring at arbitrary times and data representative of storage addresses of the continuous data which has been played corresponding to the input events; specifying one of the stored input events; and playing back a selected portion of the stored continuous data in accordance with the data representative of storage addresses which corresponds to the specified input event.

BRIEF DESCRIPTION OF THE DRAWINGS

A more complete appreciation of the present invention and many of its attendant advantages will be readily obtained by reference to the following detailed description considered in connection with the accompanying drawings, in which:

FIG. 1 is a schematic block diagram of a first embodiment of an apparatus for playing back continuous data according to the present invention;

DETAILED DESCRIPTION OF PREFERRED EMBODIMENTS

Figure 2:
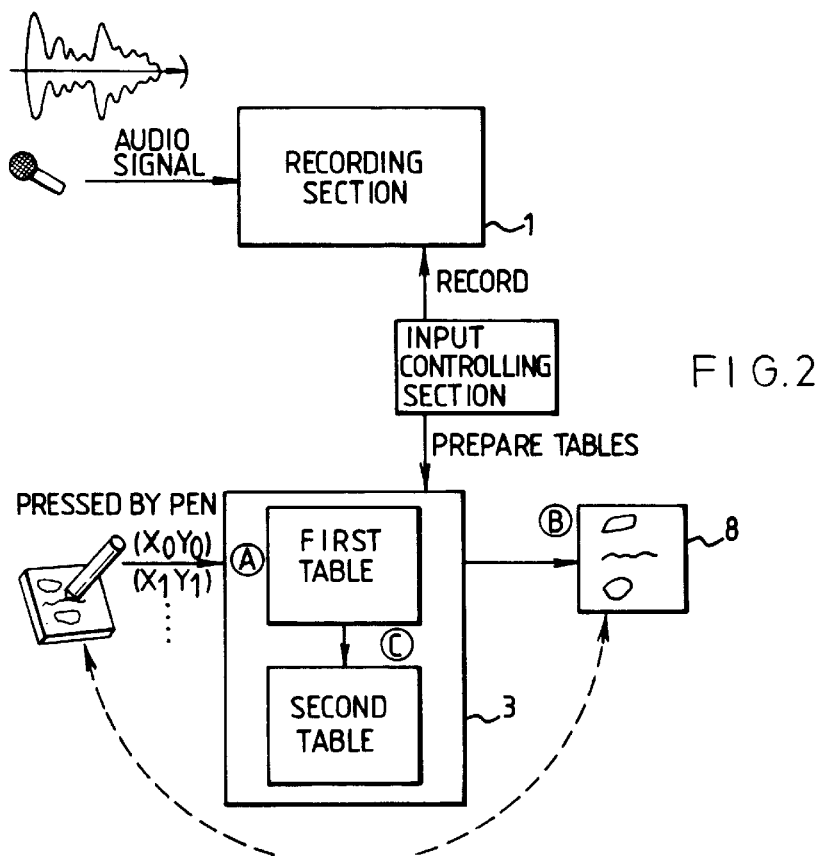
FIG. 2 is an illustrative diagram showing an operation at the time of recording of the apparatus of FIG. 1.

Referring now to FIG. 1, there is shown a first embodiment of a system for playing back continuous data according to the present invention.

In this embodiment, the system comprises a recording unit and a playback unit. The recording unit comprises a continuous data recording section 1 for recording continuous data inputted sequentially from a microphone/video camera or the like, an input event storage section 3 for storing input events inputted through a pen, keyboard, mouse or the like, a time generating section 2 for generating a present time to provide to an input event vs. time data storage section 4 the time when an input event is inputted, and the section 4 for storing a link between the input event inputted and stored and the time when the input event is inputted.

The input event storage section 3 can store the event inputted through the pen or the like as image data as it is. The section 3 can store a block of input events grouped through a grouping or recognizing section 10 as one input event. The section 3 can store data coded through a grouping or recognizing section 10 as input events. The input event is inputted by a user/operator with an arbitrary timing while the continuous data is being inputted. In other words, the input event is inputted intermittently or continually. For example, information on that character/graphic information such as a point (i.e., data linked to a location on a computer screen or a piece of paper on which the input is made), a line (i.e., a set of points), a figure (i.e., an object), stroke data, a character code, a set of character codes or the like is inputted, that they are deleted, that they are pointed, that they are specified to play back the continuous data, that they are edited, that pages are turned, that an input location is moved between windows, and that which a user has executed as the input, correspond to an input event.

The continuous data recorded through the continuous data recording section 1 are inputted automatically and continuously. For example, phonetic data such as voice data or sound data, and visual data such as a series of pictures or moving pictures correspond to continuous data. These data are in the form of an audio/video signal in general.

The time described above can be absolute time or relative time from the start of inputting the continuous data. Because the continuous data are inputted and stored as time advances, the time when the input event is inputted is associated with an address of the continuous data in storage when the input event is inputted. Thus the time data permit identifying the address of a storage location at which the appropriate continuous data are stored. A storage medium for such storage can be a memory, a disk, or an audio/video cassette tape. The address is the location in storage. For example, the address in an audio/video cassette tape is a location of the tape.

A playback unit comprises a continuous data playing back section 5 for playing back the recorded continuous data, a displaying section 8 such as a computer screen for displaying stored input events as images, a display controlling section 9 for controlling the displaying section 8, a specifying section 6 for specifying one of the input events displayed on the displaying section 8 when a user desires to play back the continuous data corresponding to one of the input events, and a playback controlling section 7 for controlling the playing back section 5 to play back a part of the continuous data using the time which corresponds to the input event specified by the specifying section 6.

Continuous data recording section 1 can be provided as a storage device such as memory, hard disk, optical disk, floppy disk, tape, or the like. Continuous data is stored in either analogue or digital form. Time generation section 2 can be provided as a clock generating the calendar clock or relative clock to the specified clock. Input event storage section 3 can be provided as a storage device such as memory, hard disk, optical disk, floppy disk, tape, or the like. Input event vs. time data storage section 4 can be provided as a table formed by software.

Continuous data playing back section 5 can be provided as a speaker or the like if the continuous data is audio. It can be provided as a camera or the like if the continuous data is video. Specifying section 6 can be provided as an input device such as a pen, a cursor, or the like. Playback controlling section 7 can be provided as software which receives a specification from specifying section 6, retrieves data from the input event storage section 3, and controls continuous data playing back section 5 accordingly.

Displaying section 8 can be provided as a display such as CRT or the like. Display controlling section 9 can be provided as software which reads data in the input event storage section 3 and displays such events on displaying section 8.

Grouping or recognizing section 10 can be provided as software which combines a plurality of input events into a group or converts input events into coded data by recognition.

Figure 37:
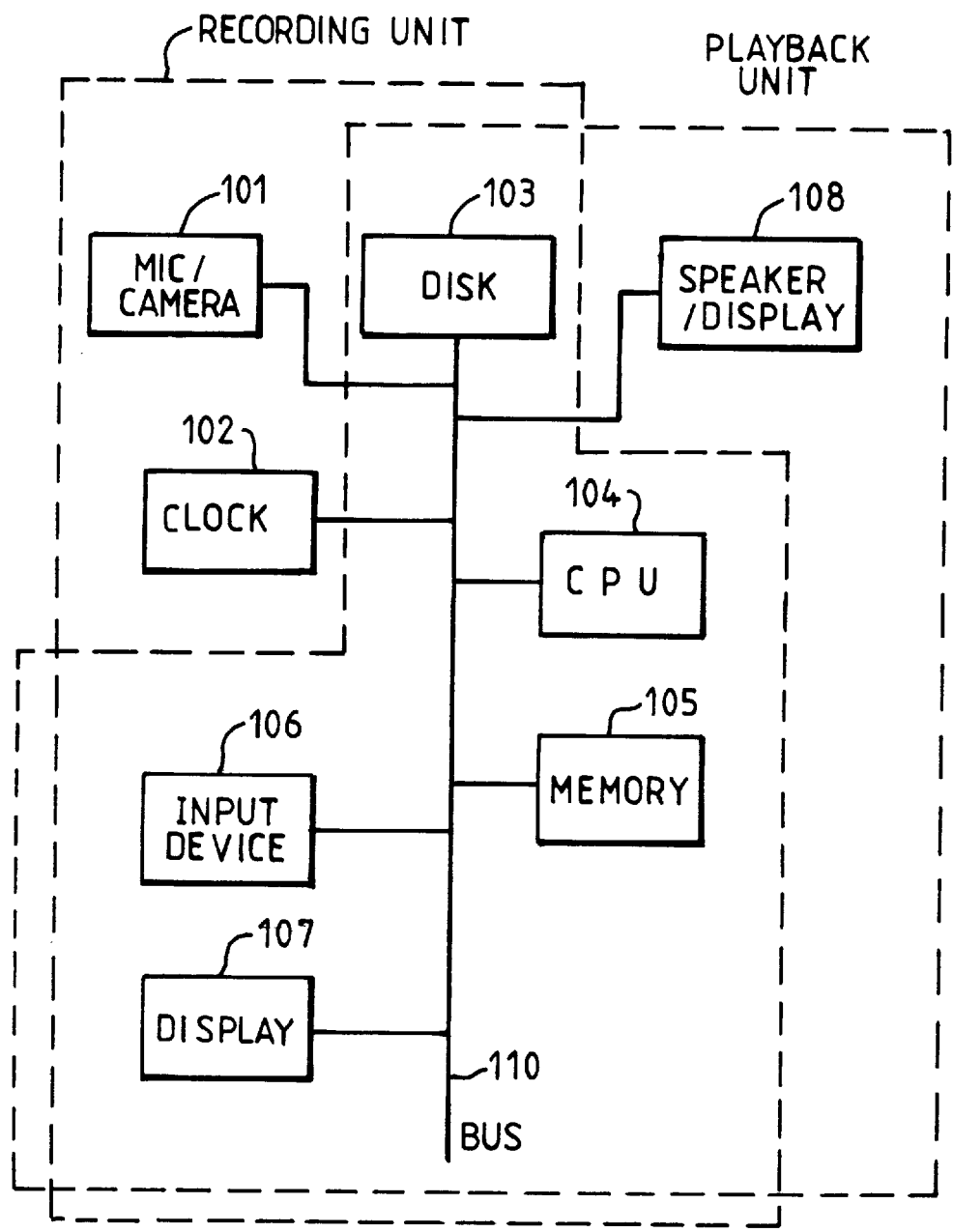
FIG. 37 is a schematic block diagram of one construction of the arrangement shown in FIG. 1.

FIG. 37 shows an example of a construction of this embodiment. Mic/camera 101 corresponds to the continuous data recording section 1 in FIG. 1. Clock 102 corresponds to the time generating section 2 in FIG. 1. Disk 103 is storage in which continuous data is stored by continuous data recording section 1 in FIG. 1. CPU 104 is a central processing unit to control other components. Playback controlling section 7, display controlling section 9, and grouping or recognizing section 10 in FIG. 1 are executed as software in CPU 104. Memory 105 corresponds to the input event storage section 3 in FIG. 1. Input device 106 corresponds to the specifying section 6 in FIG. 1. Display 107 corresponds to the displaying section 8 in FIG. 1. Speaker/display 108 corresponds to the continuous data playing back section 5 in FIG. 1. These components are connected through a bus 110 as shown in FIG. 37. Other interconnection configurations can be practiced. For example, mic/camera 101 can be connected to disk 103 directly. Speaker/display 108 can also be connected to disk 103 directly.

A displaying device used to display the input events in recording can be used also as the displaying section 8, or different devices can be used in such a way that a tablet is used in recording and a CRT is used in playback. Similarly, it is possible to integrate the recording unit and the playback unit into one device, or to provide only functions necessary for recording as a recording device and only functions necessary for playback as a playback device. In short, the recording unit and the playback unit can share a medium in which the input events and the links between the input events and the time data are stored and a medium in which the continuous data are recorded.

In this embodiment, storage addresses of the continuous data are related to each of the input events. As a result, a user is provided with a meaningful clue to an intermediate portion of recorded continuous data, and the user is able to play back the continuous data of a desired part selectively by indicating one of the input events because the user can take a quick look at the input events.

The relation between the input events and the continuous data can be simply realized, because it is not necessary to change the recorded continuous data but to reconstruct only user's input events.

For example, playback of a desired part of the continuous data is effective in a user's view when one refers to the conference in which memos and sound/pictures data are synchronously recorded.

For the convenience of the explanation, the following explanation will be made referring to a combination of a pen and sound recording. Besides the pen, various devices such as a keyboard, a mouse, a track ball and a touch panel can be used for inputting input events and/or for specifying a spot for playback. Further, the continuous data can include a video signal in addition to or instead of the audio signal. Also, the present embodiment will be described separately with respect to recording and playback.

FIG. 2 shows the operation of the system in the present embodiment during recording. First, the continuous data recording section 1 records sound data in the form of audio signals during a conference. The input event storage section 3 comprises a first table for linking input events with time data and a second table for linking locations on a display with entries in the first table.

When the pen is pressed down and a stroke is made, the current time and a sequence of coordinate points showing the stroke of the pen are recorded in the first table (operation A). At the same time, a linkage between the entry in the first table and the displayed location on the screen is written into the second table (operation C). The event inputted by the pen at this time is displayed on the screen and is sent to the displaying section 8 at the time of playback to display on the screen (operation B).

Figure 3:
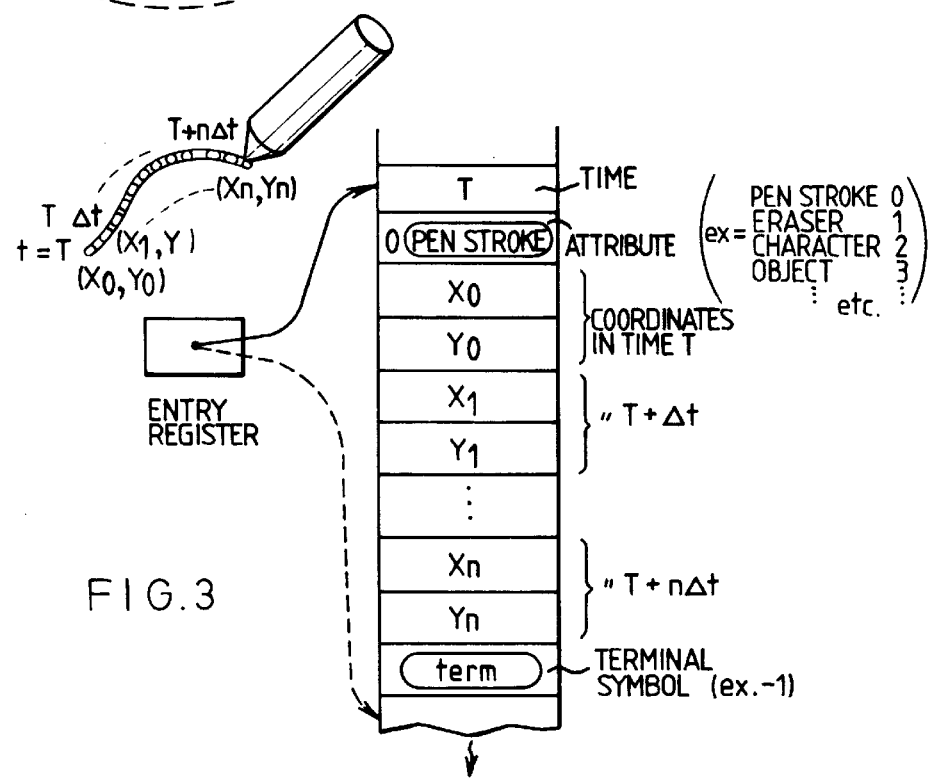
FIG. 3 and FIG. 4 illustrate an exemplary configuration of a first table used in the apparatus of FIG. 1, in accordance with a type of input event.

FIG. 3 shows an example of the first table in which is recorded a plurality of sets of the time and the input event. When a new input is made, the time, an attribute of the type of the input, and a sequence of coordinate points are written at the address in the memory pointed to by an entry register. The first table shown in FIG. 3 extends in the downward direction in the figure as a plurality of inputs are made.

The entry register points to a memory address of an area in the first table in which data concerning a next input should be entered.

The attribute field contains an identifier such as 'stroke (pen stroke)', 'keyboard input (characters)' or 'graphic object', depending on the possible types of input. Such attributes as 'move' and 'erase' described later may also be entered in this field. This is implemented, for example, by defining a unique code for each identifier beforehand, detecting the type of the input and entering the code which corresponds to the detected type in the field.

If positions of the pen point sampled every t seconds are expressed by a sequence of coordinate points, then (x0, y0) is the coordinate point at time T, (x1, y1) is the coordinate point at time T+t, . . . and (xn, yn) is the coordinate point at time T+nt.

A terminal symbol is written at the end of the sequence of coordinate points, to enable distinguishing this event from an event of other strokes, because a length of the sequence of coordinate points which compose an input event is variable. The terminal symbol is expressed by an impossible coordinate value, such as a value which is larger than the maximum value or which is smaller than the minimum value of the coordinate.

Figure 4:
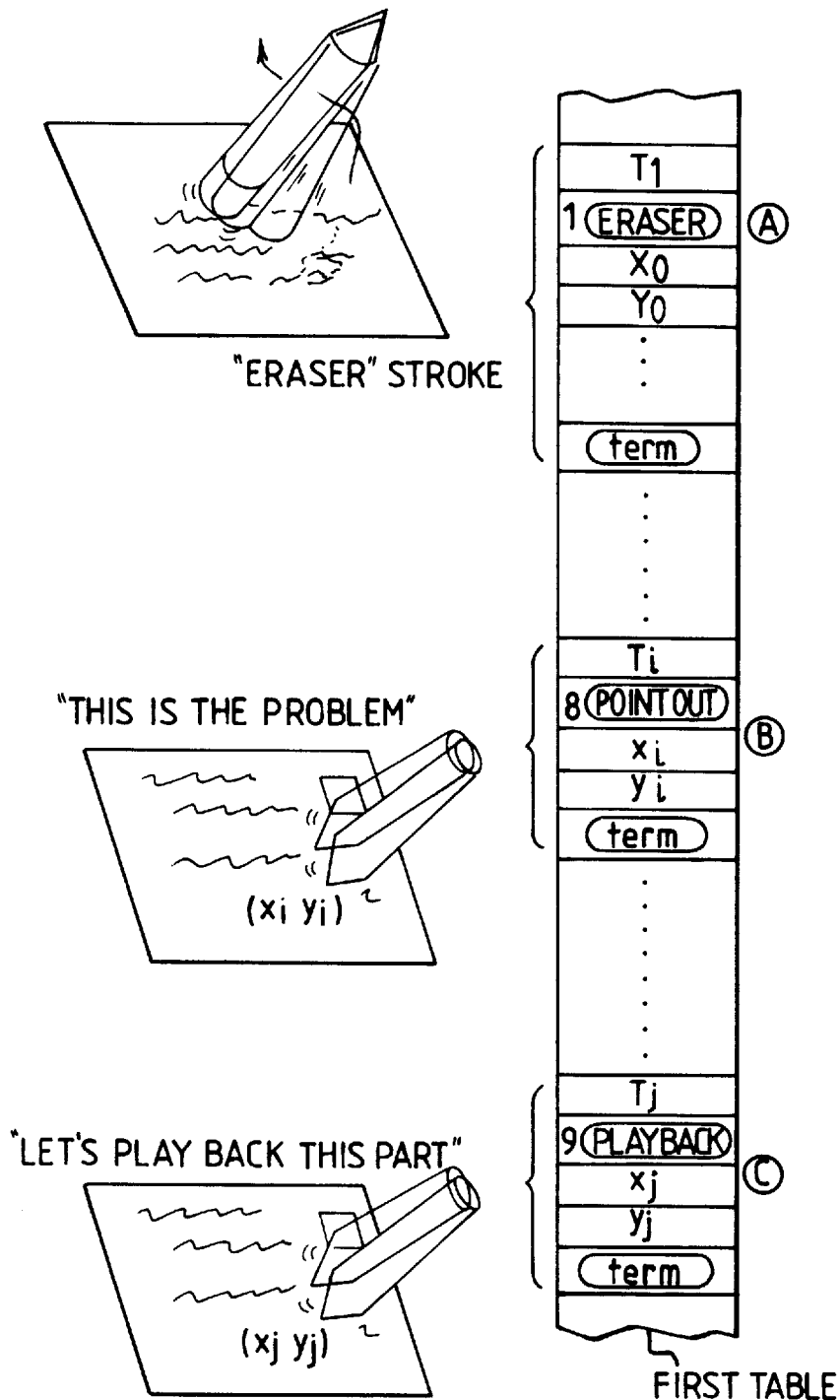

When a virtual "eraser" for erasing the stroke as shown in FIG. 4 is used, an identifier of "eraser" is entered in the attribute field in portion "A" of the first table. Whether a sequence of coordinate points detected as a stroke has been made as a "normal stroke" or by "eraser" can be determined by a button to be pressed on the pen indicating each mode, or a sensor which recognizes its posture on the pen. It is set as the "normal stroke" mode when the posture of the pen is normal, and it is set as the "eraser" mode when the pen is upside down. It is also possible to determine the nature of the stroke by an icon showing each mode on the display device, which is clicked by the user.

It becomes possible to determine if the stored input event is a "normal stroke" or "eraser", because the type of input is entered in the attribute field.

A case is considered in which a user just points to characters or figures with a pen, saying "This is the problem", when proceeding in a discussion while taking notes. Portion "B" of the first table in FIG. 4 shows an example of such a case in which one of the displayed input events is just pointed to. Whether a detected coordinate point is a "normal stroke" or "point out" is determined in the same manner as described above, and data such as "point out" is entered in the attribute field of the first table. Such input is construed also as an input event.

As described later, the recorded sound data can be partially played back and this playback can be carried out while recording in the conference, and an action for this playback is also construed as one of input events in a broader sense. When playing back a desired part of the sound data, a user will specify displayed characters and figures, saying "let's consider by playing back this part", and this specified spot is entered in the first table at portion "C" in FIG. 4 by combining the time data when the spot is specified with an identifier indicating that the input is "playback." Whether a detected input is for "playback" or not is determined by detecting a switchable mode described later.

Figure 5:
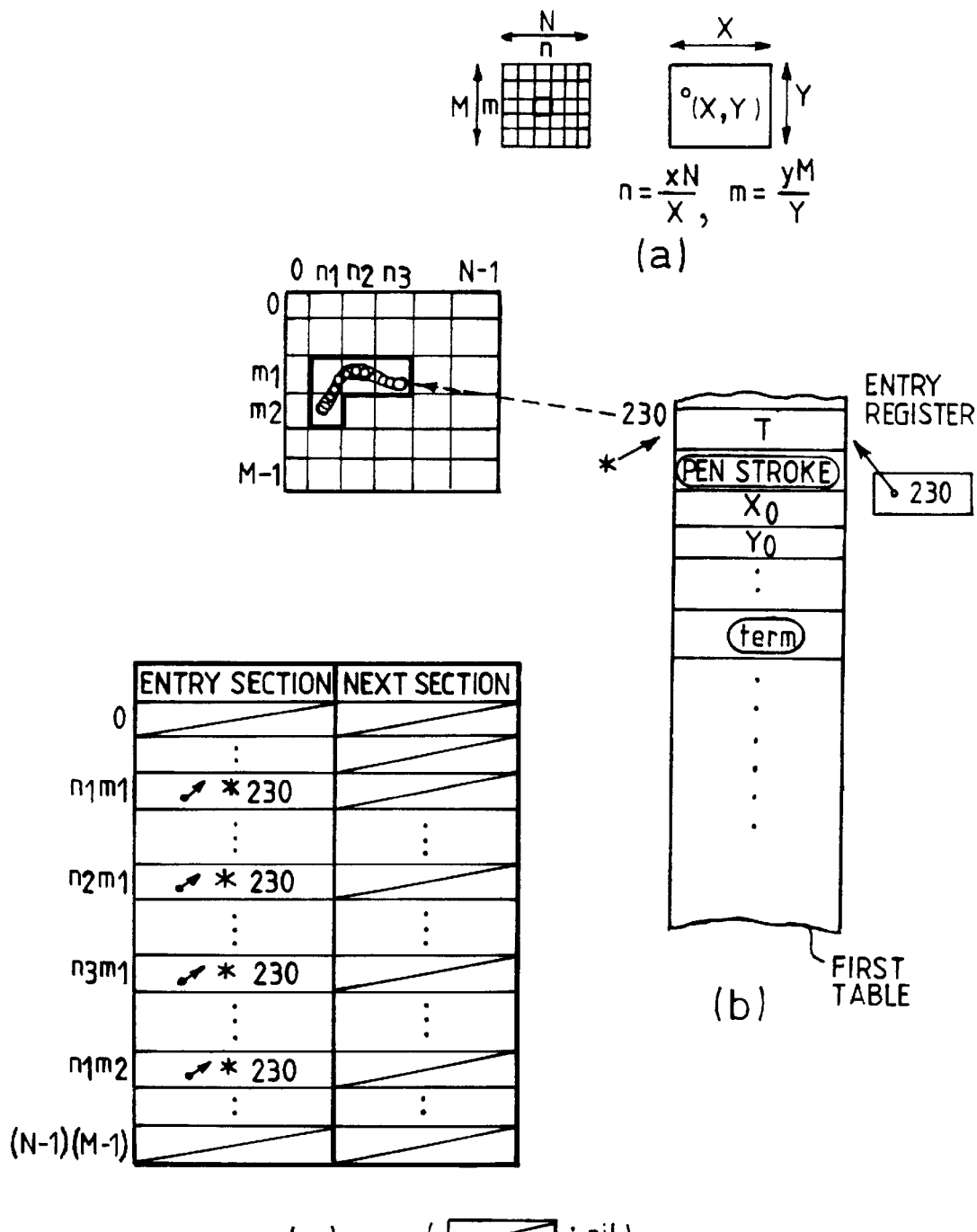
FIGS. 5(a)–5(c) illustrate an exemplary configuration of a second table used in the apparatus of FIG. 1.

FIG. 5(c) shows an exemplary configuration of the second table. The screen of the displaying device is divided into meshes of N*M as shown in FIG. 5(a), and the second table has N*M fields each of which corresponds to one of the mesh locations and has an entry section and a next section. In the initial state, both the entry sections and the next sections are all filled with nil.

When a stroke input starts, mesh locations on the screen for a sequence of points composing the stroke are calculated based on their coordinate values. For example, when a range of coordinate values of strokes is X*Y, a mesh location (n, m) has a relationship of $$n=x*N/X, \quad m=y*M/Y$$

to coordinate values (x, y) of a point. FIG. 5(b) shows a first table equivalent to that shown in FIG. 3. The location on the screen is linked with the time data in the first table, by entering a value ("230", a start address at which the current input event is stored in the first table) in the entry register of FIG. 5(b) to the entry section in the second table in the following manner.

Figure 6:
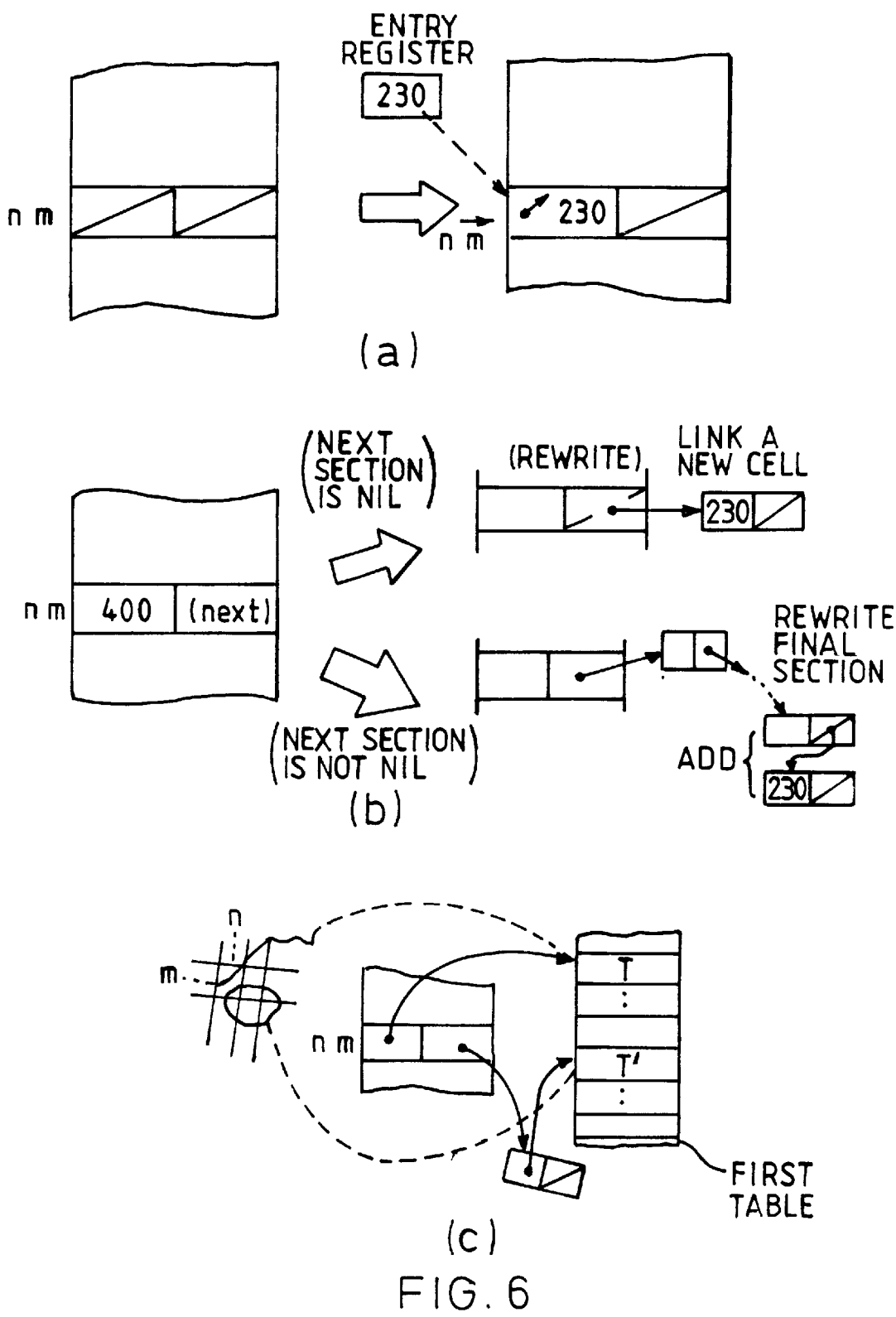
FIGS. 6(a)–6(c) show an operation of updating the second table of FIG. 5(c)

If the entry section in the field of nm in the second table referred from the mesh location (n, m) is nil, the value of the entry register at the time when the input has started is written in the entry section in the second table as shown in FIG. 6(a).

If the entry section is not nil and has been already filled with another value, a new cell is added to the final section of the list by following the list structure from the next section as shown in FIG. 6(b).

A cell comprises a pair of an entry section and a next section to hold a pointer to the first table. If the next section is nil, an address of a new cell is written in the next section and the address of the entry of the first table is written in the entry section of the new cell. If the next section is not nil, an address of a new cell is written in the next section of the last cell of the list. The address of the entry of the first table is also written in the entry section of the new cell in this case.

Thereby, even when the same mesh is linked with events at a plurality of points of time, such as when a plurality of strokes exist within the same mesh or when an event written once is just pointed to by the pen point later, each of the events can be handled as an independent input event as shown in FIG. 6(c).

Figure 7:
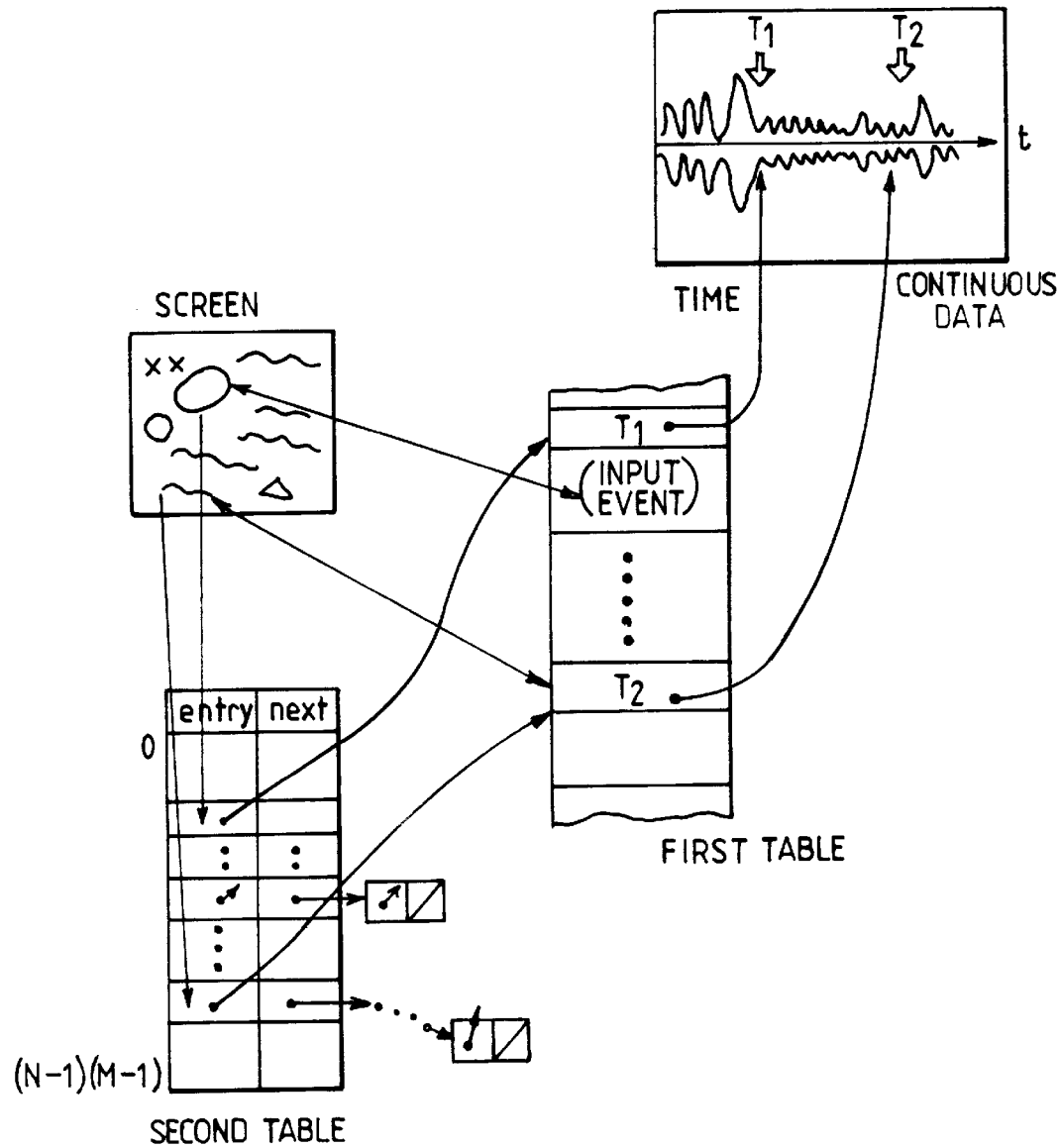
FIG. 7 illustrates a relationship among a display, the first and second tables and a time axis of the continuous data in FIG. 1 and 2.

FIG. 7 shows a relationship among the first table, second table, locations on the screen and recorded continuous data on the middle of a time axis. For example, time entries T1 and T2 in the first table correspond to locations in the continuous data. Also an input event corresponding to the continuous data at time T1 is entered in the first table. Data is written in the mesh location in the entry section of the second table corresponding to the input event on the screen, such data pointing to the entry of the first table in which the time when the input was started is written. If a plurality of input events occupy the same mesh location, the next section of the second table holds an address to cells, the entry section of the last cell containing an address of the entry in the first table.

FIG. 8(a) shows the operation of the system in the present embodiment during playback. While the continuous data playing back section 5 plays back the signal recorded in the continuous data recording section 1, it can play back only an arbitrary part specified by the playback controlling section 7, and does not playing back the recorded signal sequentially only from the top.

First, the displaying section 8 displays input events in the input event storage section 3 via the display controlling section 9 and a user specifies a desired part to be played back through pointing to one of the input events displayed on the screen of the displaying section 8 by using the specifying section 6. The location on the screen specified by the user is given to the input event storage section 3 (operation A).

Next, an appropriate part in the second table is retrieved based on this location given to select an appropriate input event stored in the first table (operation B). Then the time when the input of the appropriate input event was made is read out of the first table to send to the playback controlling section 7 (operation C). The section 7 controls the continuous data playing back section 5 so that the recorded signal is played back from the time obtained (operation D).

The section 7 determines the start address of the continuous data to be played back in the following manner. Suppose the given time datum retrieved from the first table is T, the time when recording of the continuous data was started is T0, and the amount of continuous data is S0, and D is the data amount per unit time, the start address of the continuous data to be played back is $$S=S0+(T-T0)*D$$

if D is constant, and $$S=S0+\int_{T_0}^{T} D(t)dt$$

if D is variable in time and denoted by D(t) as a function of time.

As a result, by a user pointing to an arbitrary point of pen strokes displayed on the screen, the recorded sound data at the time when the specified pen stroke was input is played back, as shown in FIG. 8(b). In FIG. 8(b), the operations A–D correspond to like designations in FIG. 8(a). A pen for input, or a mouse, a track ball or a cursor key or the like can be used as the specifying section 6. It is also possible to use a touch panel which is pressed by a finger or a pen.

Further, the same spot of recorded sound data can be played back even if any one of the coordinate points is specified by the specifying section 6, because one piece of time data corresponds to a certain set of coordinate points in the first table and the same entry in the first table is entered in a set of mesh locations corresponding to this set of coordinate points in the second table. Furthermore, a desired part of recorded data can be played back even if a point slightly offset from the coordinate points is specified by the specifying section 6, by entering the same entry in the first table not only in the mesh locations themselves on which the input event is inputted, but also in mesh locations around them.

Invisible types of input events such that a location is pointed to by a pen point as shown in portion "B" in FIG. 4 and that a location is specified so that continuous data were played back as shown in portion "C" in FIG. 4 is not displayed on the screen normally. Thus, the display controlling section 9 generates a mark which indicates that it is a location pointed to by a pen or that it is a location specified so that continuous data were played back, and the displaying section 8 displays the mark together with pen strokes, in the step when the input events are displayed on the displaying section 8. Then it becomes possible that the specifying section 6 specifies all types of the input events in the same way as above.

Figure 9:
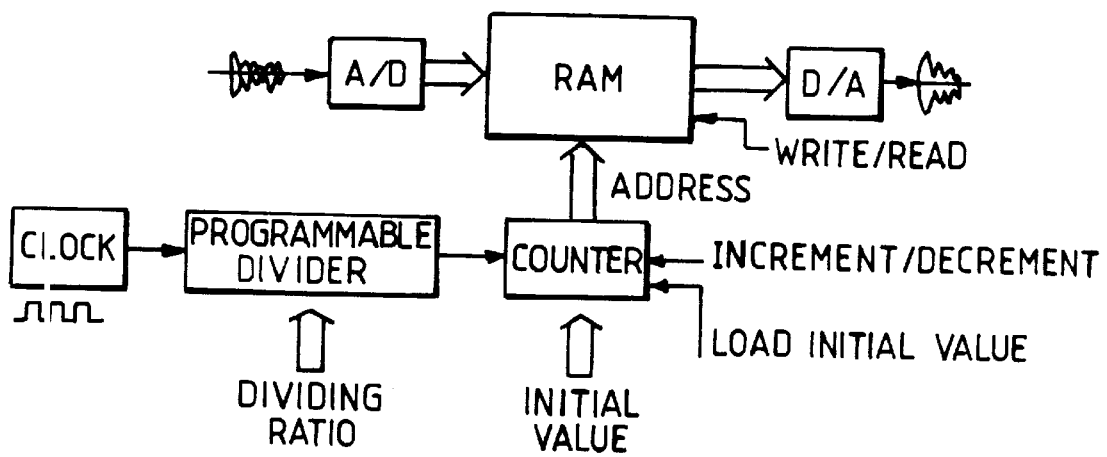
FIG. 9 is a block diagram showing an exemplary configuration of a randomly accessible recording unit for recording continuous data.

FIG. 9 is a block diagram of an exemplary configuration corresponding to the continuous data recording section 1 and the continuous data playing back section 5, capable of playing back sequentially recorded continuous data from an arbitrary time. This recording/playback unit comprises a RAM, a counter for supplying addresses to the RAM and a programmable divider for supplying a clock signal to the counter.

An initial value other than zero can be set in the counter. During recording, data is written into the RAM while the counter is incremented. At the time of playback, a desired starting point of time is first set in the counter as an initial value. Then the continuous data is read out of the RAM by incrementing the counter. Accordingly, it is possible to play back continuous data from an arbitrary point by setting an arbitrary value as the initial value of the counter, and it means that "quick feed" and "rewind" can be implemented in high speed. Furthermore, a frequency of the clock supplied to the counter can be changed and recording and playback speeds can be changed by changing the value of the programmable divider.

Figure 10:
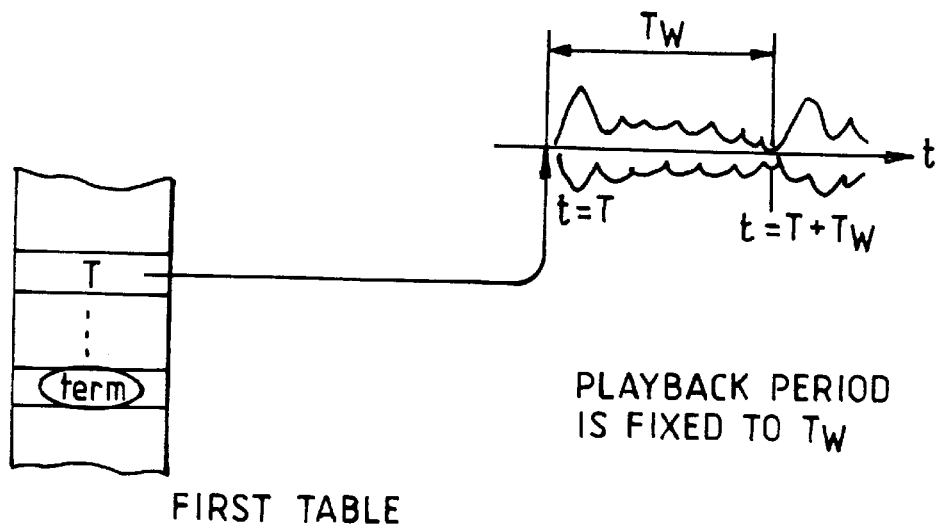
FIG. 10 illustrates an operation of playing back continuous data in a case when a playing back period is fixed.

Various playback modes are explained with reference to FIGS. 10 through 13. The playback controlling section 7 enables playing back a part of continuous data for a certain period including the time corresponding to the input event specified. FIG. 10 illustrates a case when a playback period is fixed to the predetermined time TW. In this case, continuous data is played back from the time T read from the first table to time T+TW.

FIG. 11(a) shows a case when a user is allowed to change a playback period tw. For example, as shown in FIG. 11(b), in response to a user pointing to a desired spot on the display, the display controlling section 9 displays a pop-up window on the displaying section 8 to allow the user to extend or shorten the playback period by sliding a bar on a time axis while the user watches a pointer moving to the right which indicates the time presently playing back. The playback controlling section 7 acts based on the period changed by the user.

Figure 12:
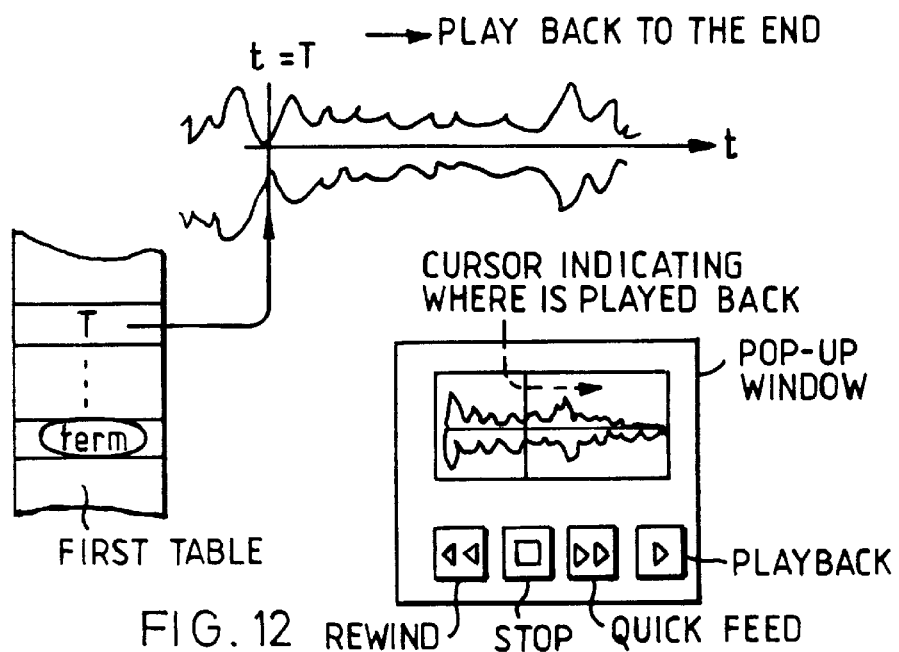
FIG. 12 illustrates an operation of playing back continuous data in a case when playing back from a specified time to the end.

FIG. 12 shows a case of playback from the time T written in the first table to the end of the recording. A pop-up window as shown in the figure is displayed on the displaying section 8 to allow a user to select an operation such as stop, rewind, or quick feed by clicking buttons even in the middle of the playback.

Figure 13:
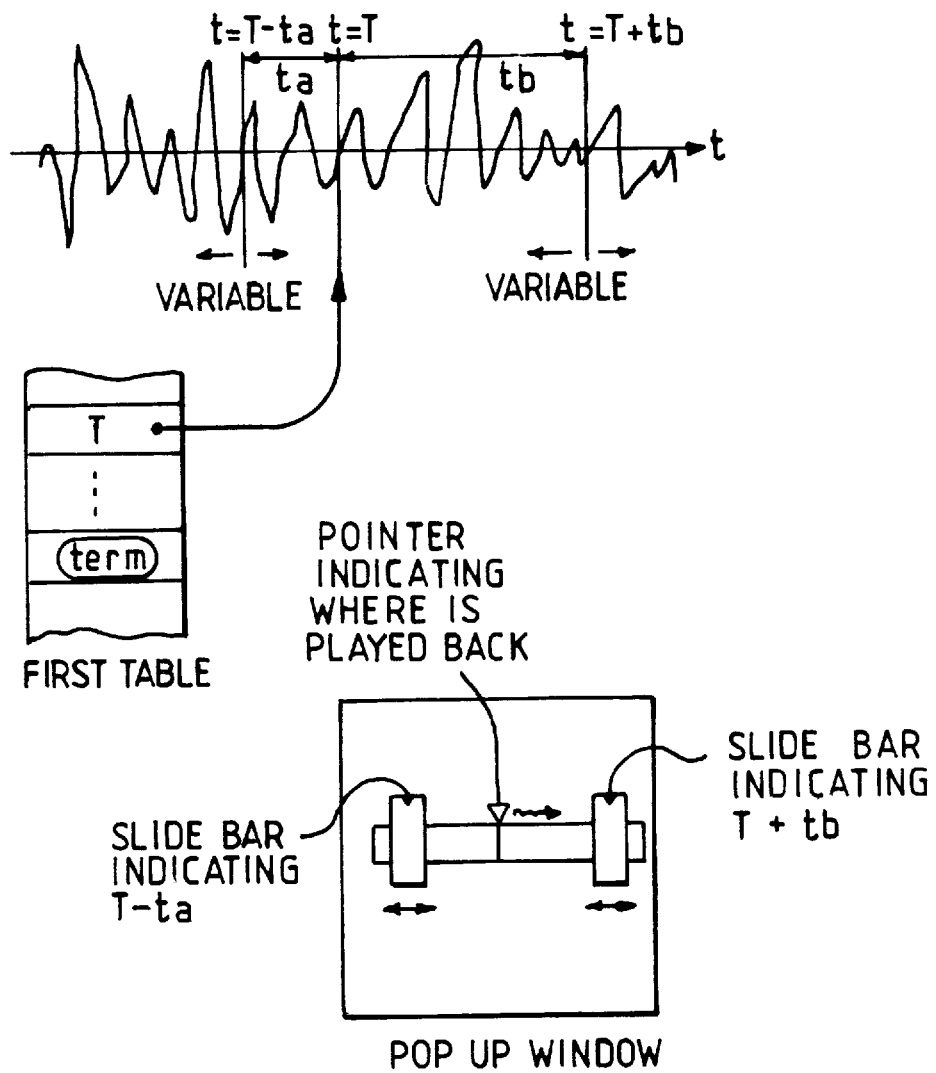
FIG. 13 illustrates an operation of playing back continuous data in a case when playing back from a time before a specified time.

FIG. 13 illustrates a case when playing back from a point of time slightly before the time T written in the first table. That is, continuous data are played back only in a period ta+tb from T−ta (i.e., forward part) to T+tb (i.e., rearward part). The period ta and tb are predetermined or determined by the user who slides the bar on the time axis on the pop-up window. A pointer in the pop-up window indicates the relative time location within the continuous data.

The continuous data recording section 1 can record the continuous data in a form of analog, digital or compressed signals. However, the section 1 must be able to identify a position in the signal where a certain time has elapsed from a position at the time T when the playback modes as shown in FIGS. 10, 11 and 13 are to be implemented.

Figure 11:
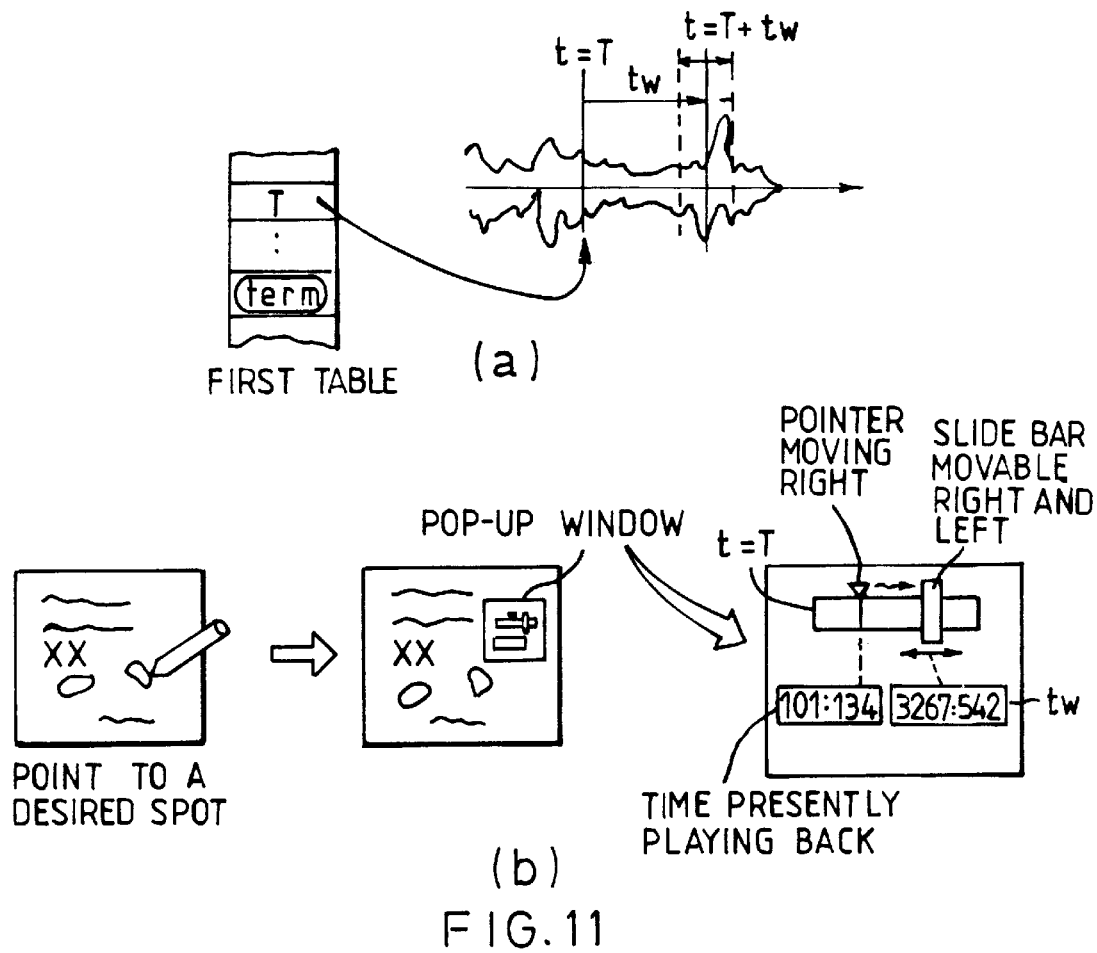
FIGS. 11(a) and (b) illustrate an operation of playing back continuous data in a case when a playing back period is variable.

In the playback modes shown in FIGS. 10, 11 and 13, it is necessary to determine when the playback stops. It is not necessary to determine the stop time in advance of the playback, but it is sufficient that the playback stops when a certain time has elapsed after the start of the playback. However, in the playback mode shown in FIG. 13, the start position must be determined before the start of the playback, because the start position is located before the signal position specified through the specifying section 6. The start position is determined by calculating a product of time ta and data amount per unit time and by setting a value obtained by subtracting the product from the signal position of time T as the initial value of the counter shown in FIG. 9 when the data amount per unit time is constant. Further, when the data amount per unit time is variable, the start position is determined by using data relating to time by integration, if its coding method contains information about the relation between data and time. Otherwise, it is necessary to establish correspondence between positions of the continuous data and time at adequate intervals in recording and compressing.

As described above referring to FIGS. 8(a) and 8(b), the mechanism of the playback system has been explained with respect to how a user points to an arbitrary point in the accumulation of input events displayed on the screen and plays back continuous data at the point of time when the input event is inputted. Now, FIGS. 14 through 18 are referred to for explaining various manners of screen display and playback.

Figure 14:
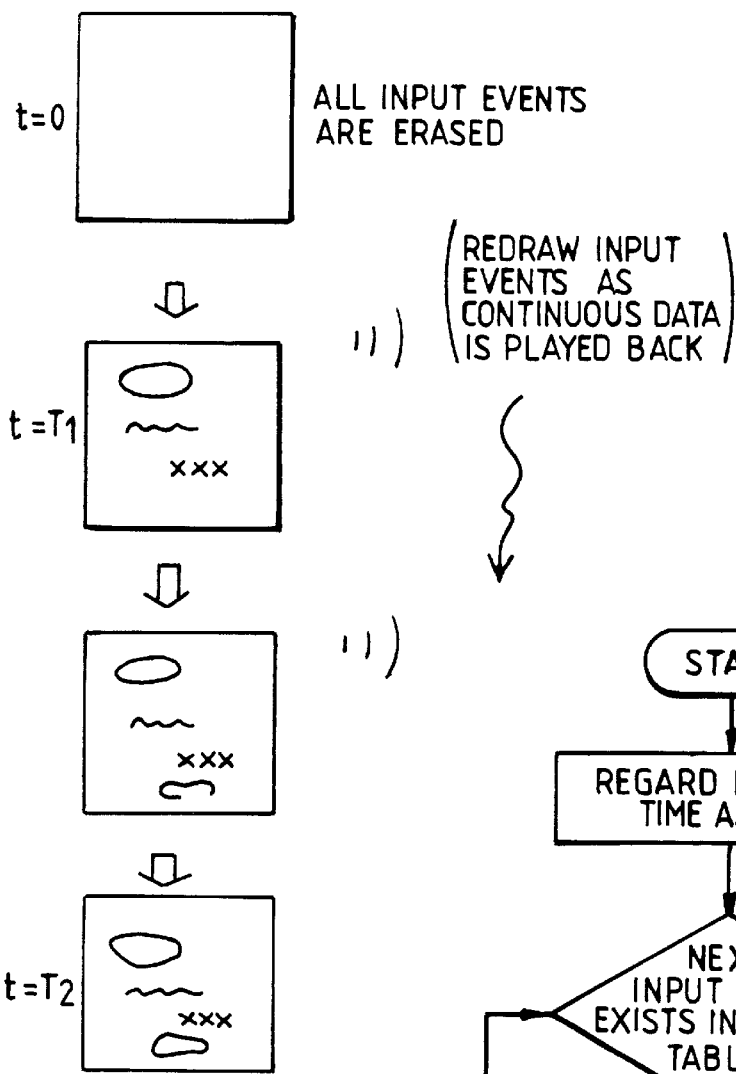
FIG. 14 and FIG. 18 each show an operation of real-time redrawing of input events on the display synchronized with playing back continuous data.

FIG. 14 shows a case when all of the input events on the screen are first erased at time t=0 and then redrawn in real time as the recorded continuous data is played back. In this case, the display controlling section 9 redraws the input events on the screen of the displaying section 8 in synchronization with the playback by the continuous data playing back section 5 so that it plots the input events stored in the first table in the same order as they were inputted earlier. This process is illustrated in the flow chart in FIG. 15. In the flow chart, the start time stored in the first table is supposed to be zero. Otherwise, a value obtained by subtracting the start time from the time written in the first table is considered as the time T.

It is effective not only to redraw the stroke inputs by a pen, but also to display, by collating the attribute fields in the first table, a mark that indicates a place pointed by a pen and a mark that indicates a spot to be pointed to for playback at an appropriate location on the screen in this case and the following case.

Figure 15:
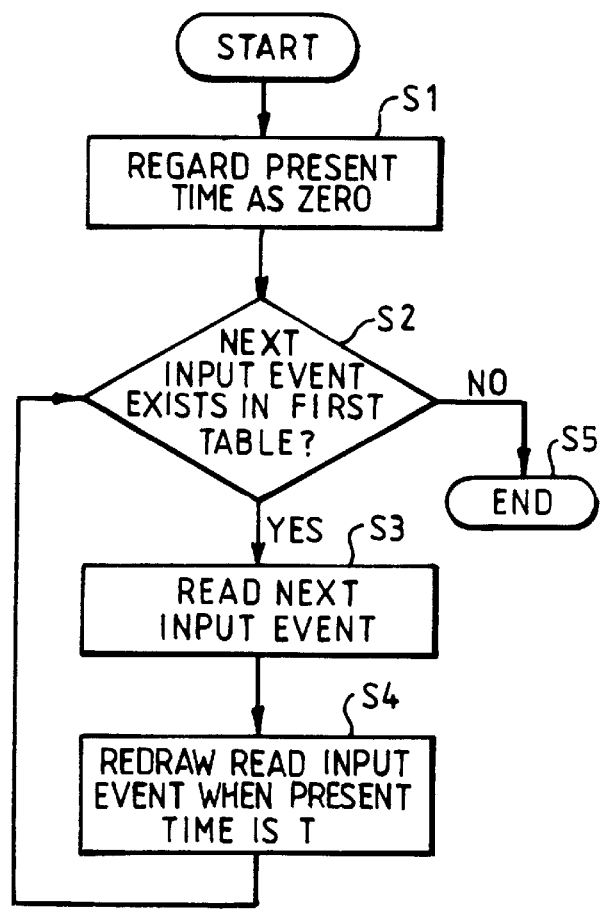
FIG. 15 is a flow chart of a display controlling section in the case of FIG. 14.

With reference to FIG. 15, the redrawing process in FIG. 14 commences at step S1 in which the present time is regarded as zero. Next at step as S2, it is determined if the next input event exists in the first table. If it does, then step S3 is performed in which the next input event is read. At step S4, the read input event is redrawn when the present time is T. At step S2, if a next input event does not exist in the first table, then the program ends (step S5).

Figure 16:
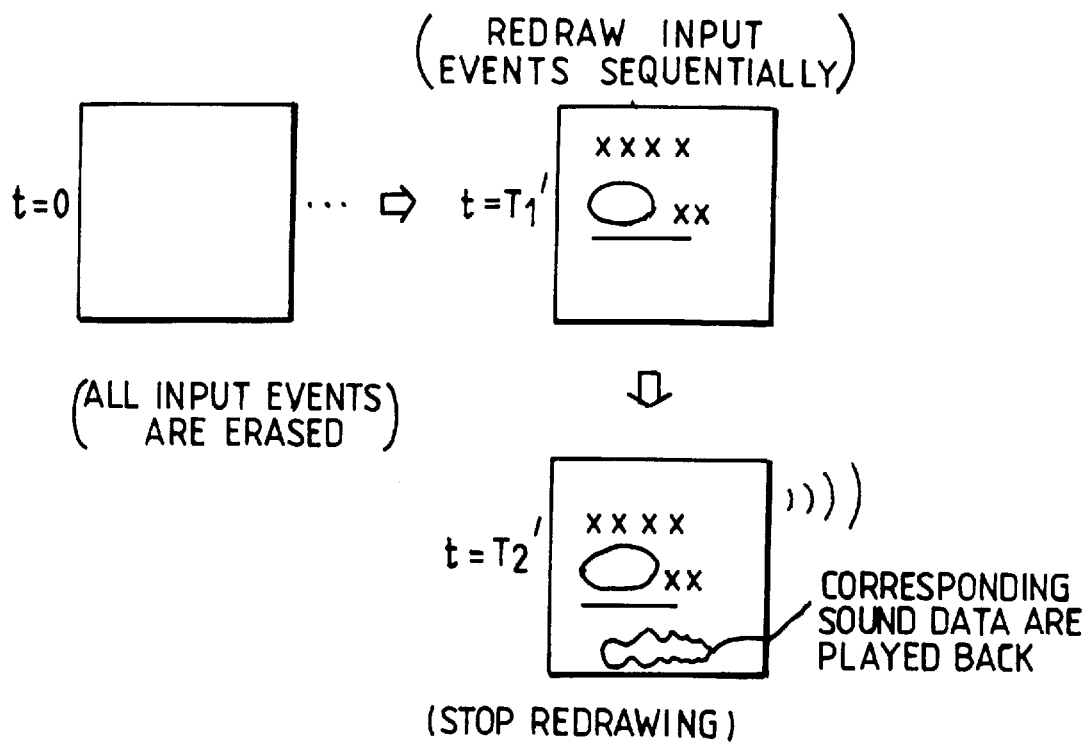
FIG. 16 shows an operation of a quick feed in redrawing input events on the display in advance of playing back continuous data.
Figure 16:
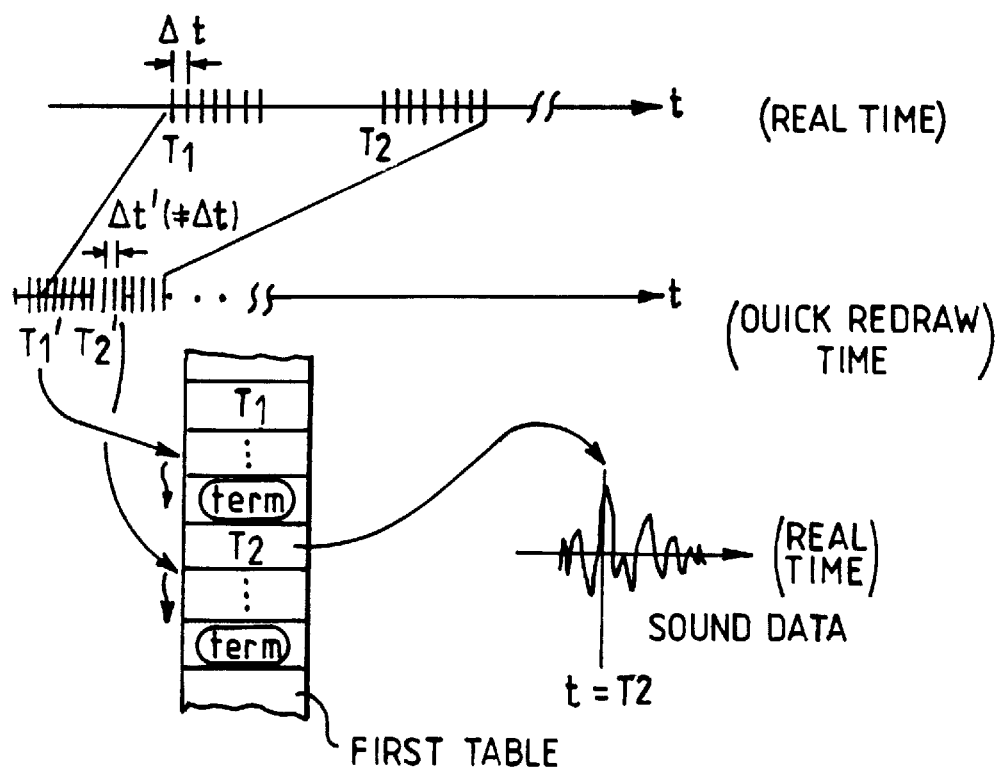

FIG. 16 shows a case when all the input events on the screen are first erased and then redrawn without playing back the continuous data. In this case, the display controlling section 9 can change the redrawing speed. It redraws the input events stored in the first table on the screen at higher speed instead of conforming to the time data as long as it maintains the order of the input events, according to FIG. 17's flow chart.

As seen in FIG. 16, input events are redrawn in sequence and are shown at times T1' and T2', with corresponding sound data being played back at, for example, t=T2'. As further shown in FIG. 16, the quick redraw time scale is substantially compressed in comparison with the real time scale.

Figure 17:
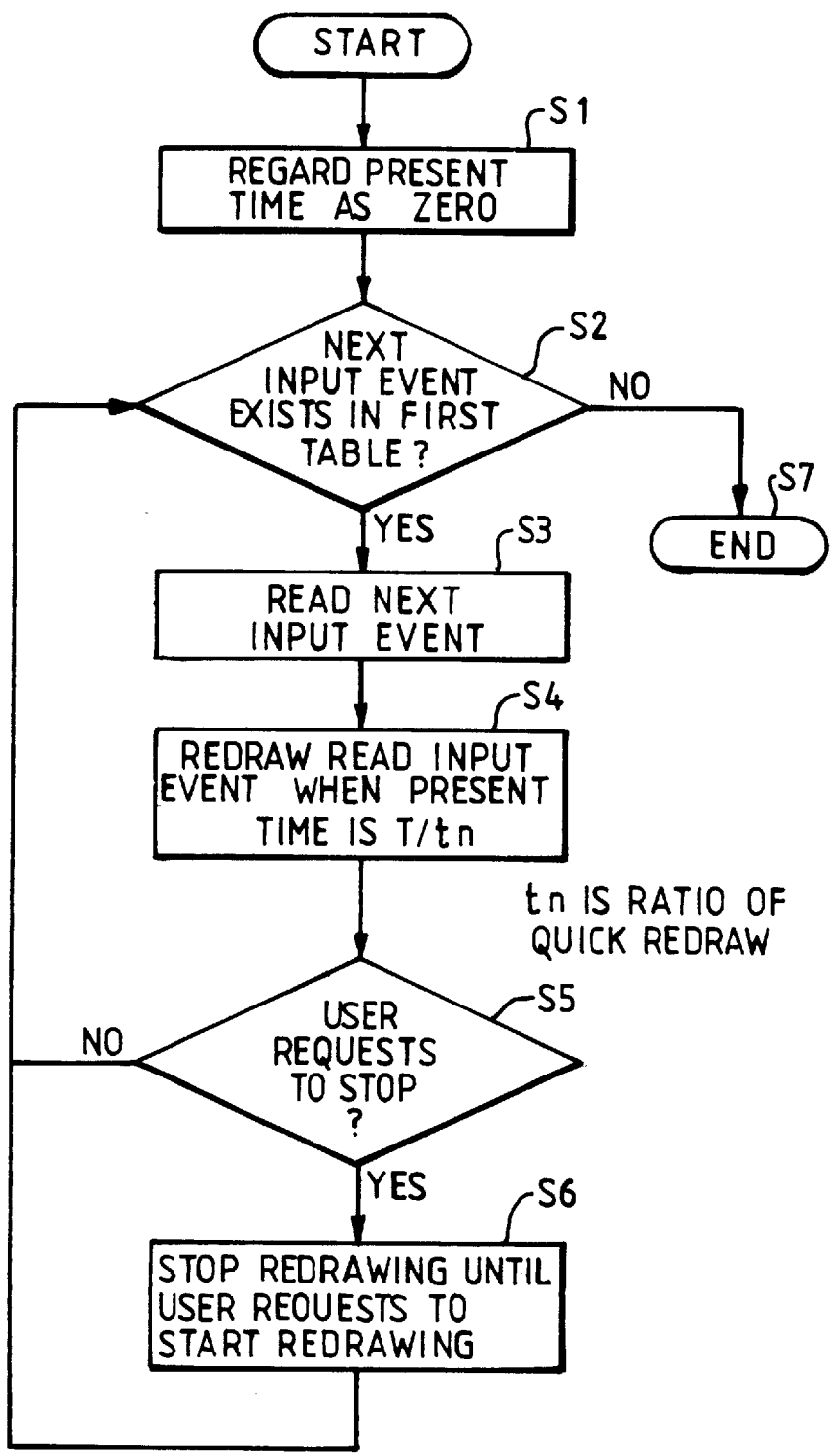
FIG. 17 is a flow chart of the display controlling section in the case of FIG. 16.

With reference to FIG. 17, the redrawing process in FIG. 16 commences at step S1 in which the present time is regarded as zero. Next at step S2, it is determined whether a next input event exists in the first table. If such an input event exists, step S3 is performed in which the next input event is read. Then at step S4, the read input event is redrawn when the present time is equal to T/tn. Next at step S5, it is determined whether the user has requested that the redrawing operation is stopped. If the user has not so requested a stop to the redrawing process, the process returns to step S2. If at step S5 the user has requested that the redrawing process be stopped, then the process is stopped at step S6 until the user requests that it begin again. At step S2, if there is no next input in the first table, the process ends (step S7).

When the input events are quickly redrawn as described above, a user can stop it to play back the continuous data. The ability of the user to stop is for specifying a desired part of the continuous data to be played back on the screen. This is useful in a case when it is difficult to clearly remember the sequence of strokes (i.e. the process of the conference) even if the whole input events can be seen at one time later, such as a memo taken in a brainstorming or a document edited during a meeting. Thus, while the input events are quickly redrawn, a user can stop it and play back the recorded data to remember the progress of the conference, by the method explained in FIGS. 8(a) and 8(b).

Thus, it is possible to play back the desired part of the continuous data in a process of displaying the input events sequentially following the order of input. It is also useful in a case of taking a memorandum while a user repeats writing and erasing often, because the input events can specify the spot of the playback by taking a quick look at the process of the discussion.

Figure 18:
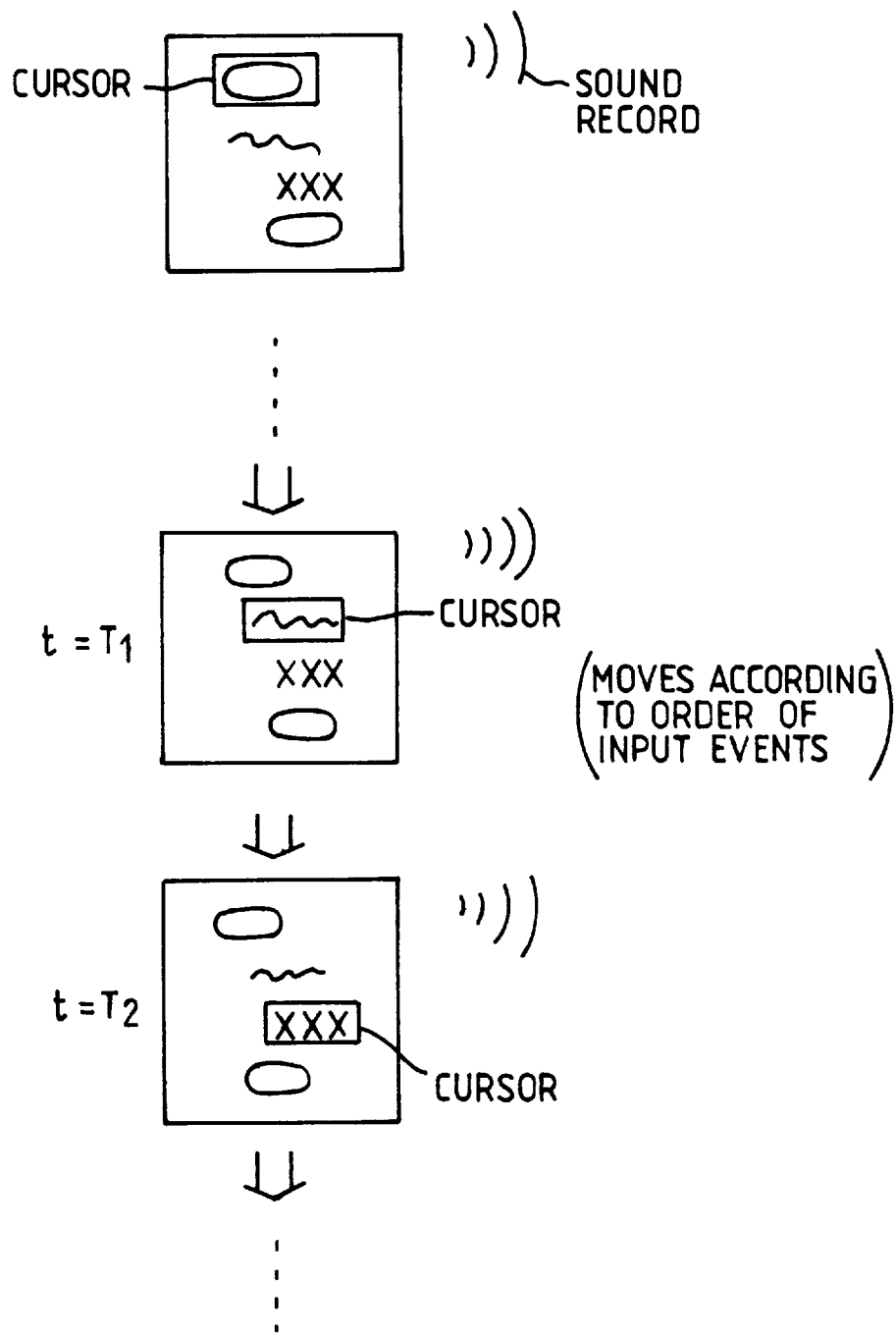

FIG. 18 illustrates a case when the input events are not erased, though the method of playback is equivalent to that shown in FIG. 14 or that shown in FIG. 16. The input events stored in the input event storage section 3 are displayed on the screen in the initial state and a cursor is moved to appropriate points on the input events synchronized with the playback of the sound record (e.g., at times t=T1 and t=T2 as shown in FIG. 18). Various cursors such as a frame cursor (as shown in FIG. 18), highlighting cursor, inverted cursor, underlining cursor, coloring cursor or the like can be used to show how the recording was proceeding. In this case, the display controlling section 9 follows the first table and modifies the display on the screen in accordance with the aforementioned sequence. The color of the cursor can be changed or inverted in a certain unit (for example, a series of strokes) at one time, so that the user can readily see the movement of the cursor.

In FIGS. 14 through 18, it is also possible to redraw the input events from the middle of the sequence. For example, when a time is specified, the display controlling means 9 sets the time given, not zero, to the present time in FIGS. 15 and 17, and retrieves the input events stored after the specified time in the first table.

Figure 19:
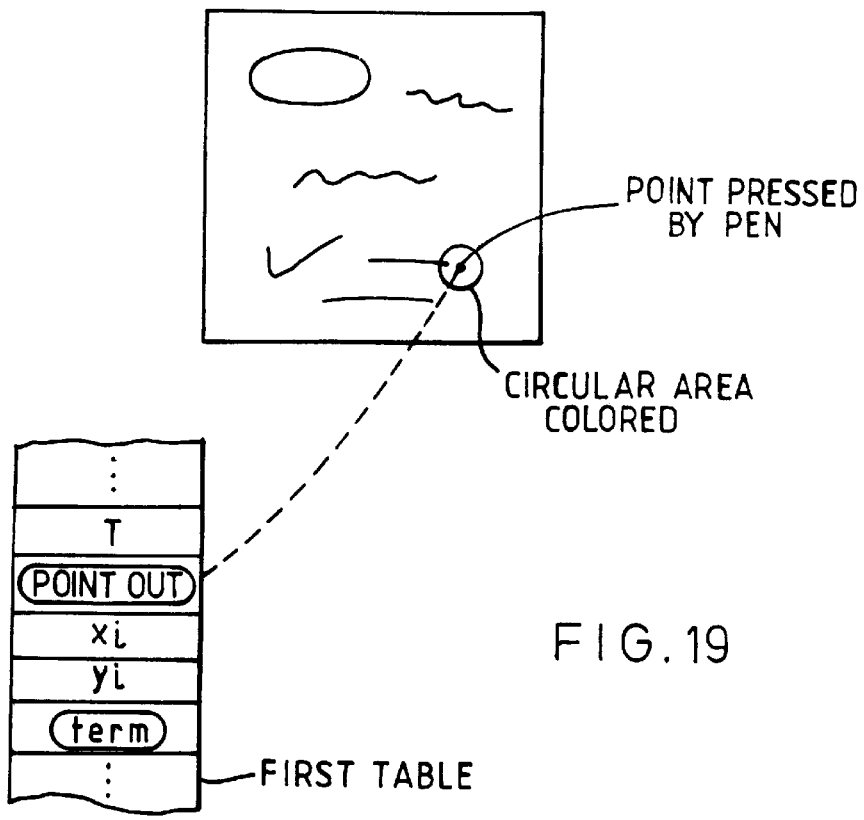
FIG. 19 shows an exemplary image on the display of stored input events including a point pressed by a pen.
Figure 20:
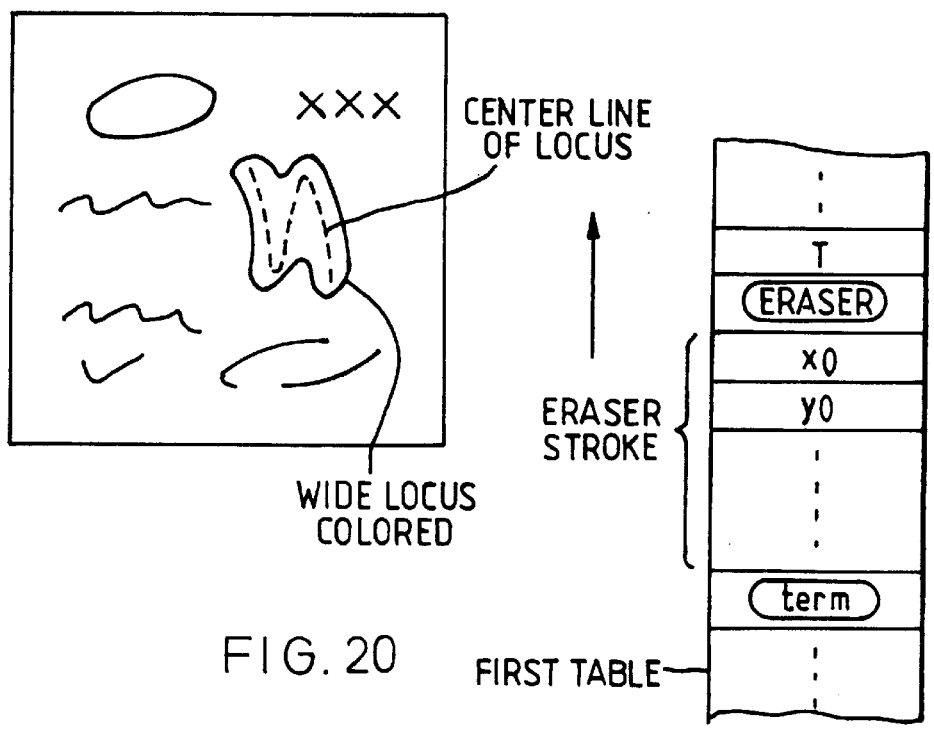
FIG. 20 shows an exemplary image on the display of stored input events including a locus of an erasure.

FIGS. 19 and 20 show exemplary images in cases when an invisible type of input event is displayed during playback as previously described with reference to FIG. 4. FIG. 19 shows a case when the input event of a point pressed by a pen point is displayed. It is displayed for example by expanding the area surrounding the point to an adequate size of a circular area and by changing the color thereof. Whether it is a point just pressed by a pen is determined by the description of the attribute field in the first table as shown in portion "B" and "C" of the first table in FIG. 4. In FIG. 19, an attribute "Point Out" is stored in the first table in correspondence to the input event. Thus, an input event which can be selected so that a corresponding sound record is played back exists also at this location.

FIG. 20 shows a case when a stroke of an "eraser" is displayed. Whether an input event is a locus of the eraser or a normal stroke is determined by the description in the attribute field in the first table as shown in portion "A" in FIG. 4, and also shown in the first table in FIG. 20. In the case of the eraser, a wide locus as shown in FIG. 20 is displayed centering on the sequence of coordinate points entered in the first table. In FIG. 20, the locus of the eraser is lying along the stroke of the pen input, but the pen and eraser loci are displayed with different colors or brightness to be distinguished from each other. It is also possible not to display anything on an erased portion in the initial state and to display only a locus of the eraser or an erased pen stroke when the user requests it.

Figure 21:
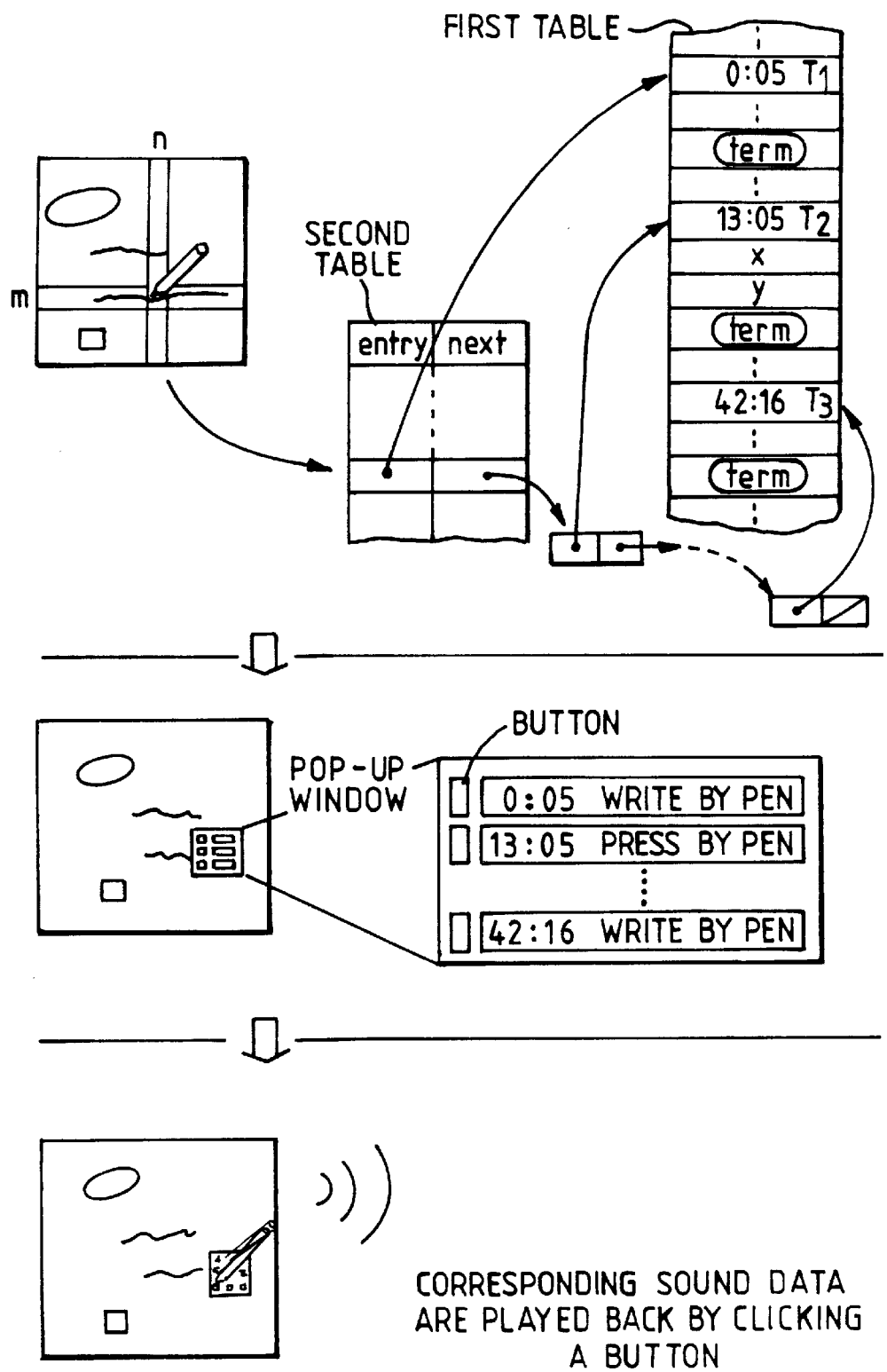
FIG. 21 shows an operation of specifying one of input events inputted at a plurality of points of time on the same location on the display.

FIG. 21 illustrates a method for displaying when input events at a plurality of points of time exist within the same mesh. As explained with reference to FIG. 6, whether events at a plurality of points of time exist within the same mesh or not is determined by finding if the next section in the second table is filled with a value or nil. If it is not nil, input events at a plurality of points of time are registered in the list structure.

In this case, the display controlling section 9 displays a pop-up window as shown in FIG. 21. As seen in FIG. 21, the user selected mesh location corresponds to an entry providing a first time T1 in the first table. The mesh location also corresponds to next section information identifying times T2 and T3. As a result, upon a user specifying a location on the screen wherein the events at the plurality of points of time exist via the specifying section 6, a time when each input has been made (e.g., times T1, T2 and T3) and a type of the input are displayed in the pop-up window. A plurality of input events that correspond to the location on the screen are retrieved from the first table by following the list structure of the second table. When the user selects which point of time is to be played back via the specifying section 6, such as by "clicking a button" in the pop-up window, a part of the continuous data which corresponds to the selected input event is played back with the mechanism shown in FIG. 8(a).

As an alternate method, it is possible to play back a part of the continuous data which simply corresponds to that which was written last or written first, and to play back another part which corresponds to another input event each time the user requests.

The present invention can be practiced not only in the case in which recording and playback are explicitly separated, i.e., the case in which input events and continuous data are recorded during recording and just selected and redrawn without recording during playback. It can be also practiced in the case in which continuous data is recorded while input events are selected and continuous data are reproduced. In the latter case, as described in FIG. 4 with respect to portion "C" of the first table, the sound/pictures such as conversations, actions and scenes during playing back the sound/pictures are recorded. These sound/pictures are linked with an input event of "playback" linked with a location on the screen. Thereby, this record is also selectively played back later by the mechanism shown in FIG. 8(a).

The present invention can be practiced not only in a case in which the second table has been made during recording and is collated during playback to retrieve the linkage between the location on the display screen and the input event accompanying the time data, but can also be practiced in a case in which the user uses a different (in size and the number of pixels) displaying device during playback from that during recording. In the latter case, the display controlling section 9 rewrites the second table so that the mesh location conforms to the present displaying section at least before the specified input event is retrieved from the second table during playback. This rewriting can be performed before displaying the input events in the first table for the playback.

The present invention can also be practiced in a system which does not need to deal with a complicated editing processes. In this case, the steps of operation "C" in FIG. 2 and operation "B" in FIG. 8 can be omitted, having only the first table without the second table, and the coordinate values (x, y) can be converted to mesh locations (n, m) when displaying input events on the displaying section 8 and the mesh locations (n, m) can be converted to coordinate values (x, y) when retrieving the corresponding input event to the specified mesh location from the first table (operation "A" in FIG. 8).

The present invention can be applied not only to a case in which there has been no input event at the start of inputting, but also to a case in which some input events have been already inputted in the initial state and new input events are added or old input events are changed. In such a case, an input event which can be specified so that a desired part of the record is played back is only an input event which is added or moved from the initial state.

The present invention can be applied not only to the system in which the screen has a single page, but also to a system having a plurality of screen pages. The latter system will be useful for a conference that lasts for a long time. Such a system is realized by providing a plurality of first and second tables each of which corresponds to one page. When a page is to be turned during recording, the time when the page is turned and the identifier "turn of page" are entered in the last position of the first table corresponding to the page. When a next page exists during playback, an icon indicating "turn of page", is displayed on the lower right corner of the screen, for example, to permit playing back the record from the point in time when the page was turned, by clicking the icon.

The present invention can also be applied to a computer system having a multi-window system. The invention can be applied to only a specific window, or to a plurality of specific windows, or to all windows. In the latter two cases, each of the windows can have dedicated first and second tables, or the whole of windows can share a single set of first and second tables.

The present invention can be practiced in a case when a device for specifying a spot to initiate playback and a device for inputting input events are separately provided, as well as in a case when one input device is used as both means for inputting input events and for specifying a spot. In the former case, it is possible to input an input event by one device for inputting while specifying a spot using the other device to specify playback of sound/pictures. This is effective in the above-mentioned case when continuous data is recorded while input events are selected so that continuous data are played back.

In the latter case, an input must be clearly distinguished as an input event from a specification of a spot. That is, the input device must have modes. The mode is set by a user, for example, by means of a button or an icon. The mode at the start can be determined in default. If the playback is stopped after a certain period of time as shown in FIGS. 10, 11 and 13, the modes can be switched automatically from playback to recording when the playback stops. If a plurality of windows into which input events to be linked with continuous data are inputted exist in a multi-window system, it is possible to switch a default mode of the destination window when a location pointed by the input device moves from one window to another.

Examples of uses of the recognizing section 10 shown in FIG. 1 are discussed next. When a character is inputted by a stroke, it is possible to incorporate a character recognition to store its result in the input event storage section 3, as well as to store it as a pen stroke. In this case, the character recognition is performed in the recognizing section 10 and the character code after the recognition is stored in the first table as shown in FIG. 3. Accordingly, the first table can take a form of a second embodiment described below. This technology can be applied to a case when voice recognition converts a voice as input events to coded data in the recognizing section 10. Thus, various input media can be processed through the recognizing section.

Further, when a circle or a line is drawn freehand, it is possible to perform graphic recognition in the recognizing section 10 and store such information as the type of the graphic is a "circle", coordinates of the center, a radius and the like in the first table, as in the case with a pen stroke. Further, sound/pictures at the time when such an input as surrounded by the circle was made are played back by pointing to any point within the circle, by entering the same entry in the first table in all of the mesh locations surrounded by the circle in preparing the second table.

While input events are inputted by the pointing device in the first embodiment described above, input events can also be inputted by means of a keyboard, as described with respect to a second embodiment of the invention.

Figure 22:
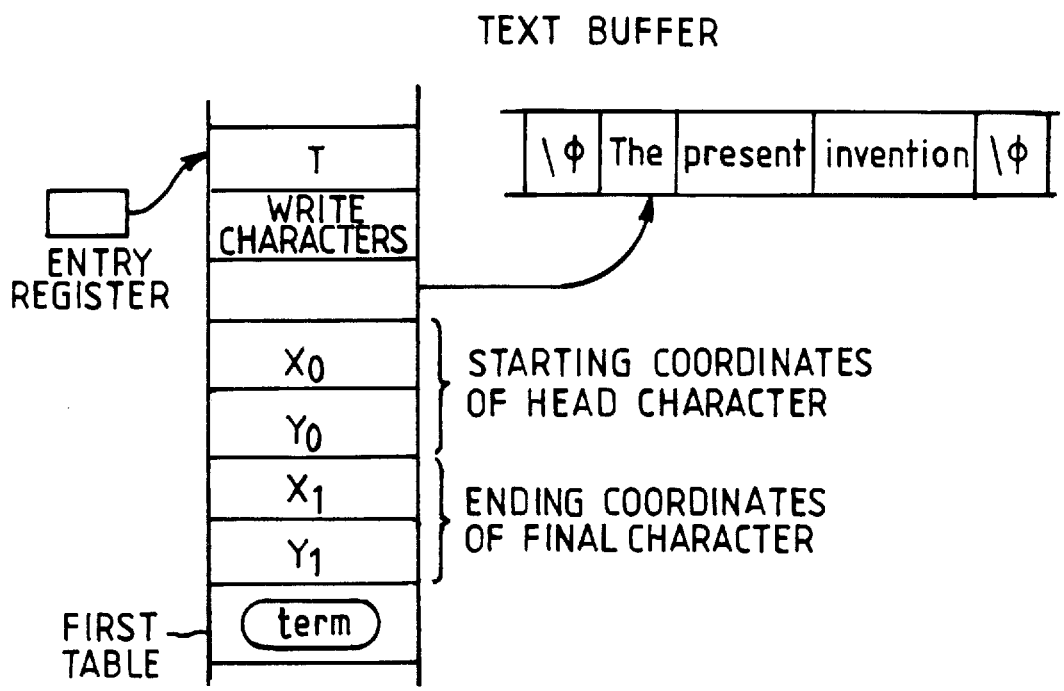
FIGS. 22(a) and (b) illustrate a second embodiment of an apparatus for playing back continuous data according to the present invention.
Figure 22:
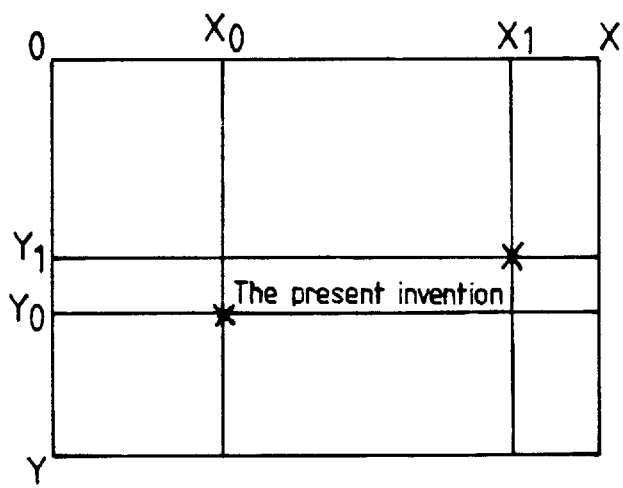

FIG. 22(a) shows an exemplary structure of the input event storage section 3 in the second embodiment. When a new character input is made, the time, a code which represents "write characters" which is a type of input, a pointer to a character string, starting coordinates of the head character and ending coordinates of the final character are stored in the first table beginning at the address in the memory indicated by the entry register. This stored information also represents an input event.

The starting coordinates and ending coordinates need not be stored when only code information is handled as in a text editor, but are necessary when a character string can be inserted in a picture. Here, the character string is stored in a text buffer and it is ended by a code '¥0' for example. The first table in FIG. 22(a) indicates that the character string "The present invention" is written from the starting coordinates (x0, y0) to the ending coordinates (x1, y1) at the time T. In the second table, pointers are written in all of the mesh locations which correspond to a rectangle including apexes (x0, y0), (x1, y1), as shown in FIG. 22(b), to this entry of the first table.

The time when the character string is deleted, a type of input of "delete characters", a pointer to a text buffer in which the deleted character string has been stored, and the like are stored in the first table in the same manner as in the first embodiment, when a character string which has already been inputted is deleted. Similarly, the time when it is pointed to, a type of the input of "point characters", a pointer to the text buffer in which the pointed character string is stored, and the like are stored in the first table in the same manner as in the first embodiment, when the character string which has been inputted is pointed to.

A mechanism for playback is realized in the same manner as in the first embodiment. First, the displaying section 8 displays the character string in the input event storage section 3 and the user specifies a desired string on the screen by using the specifying section 6. Based on the specified location on the screen, an appropriate part in the second table is retrieved to select an appropriate input event stored in the first table. Then the time T selected is sent to the playback controlling section 7 to control the continuous data playing back section 5 so that the signal recorded is played back according to the time T. As a result, sound/picture at the time when the input is inputted is partially played back. If displaying information which shows that deletion of or pointing to the character string has been performed on an appropriate spot of the screen, such part of the time data can be also partially played back.

In the above-mentioned case of using a text editor, the second table is not necessary because the character string and the time of input, deletion or pointing can be directly linked. When the user specifies one of the character strings, an appropriate part in the text buffer is retrieved to select an appropriate input event stored in the first table by tracing the pointer inversely. Here, a unit of character string linked with one time data can be one character, for example, one Japanese syllable-Chinese character conversion unit, one line, one text or one paragraph.

The present invention can be applied to a system in which both graphic information and character strings are assumed as input, for example by combining the mechanisms of the first and second embodiments.

In accordance with a third embodiment, the present invention is applicable to a system in which processes of modification such as move, enlarge, reduce and the like are added to input events already inputted.

Figure 23:
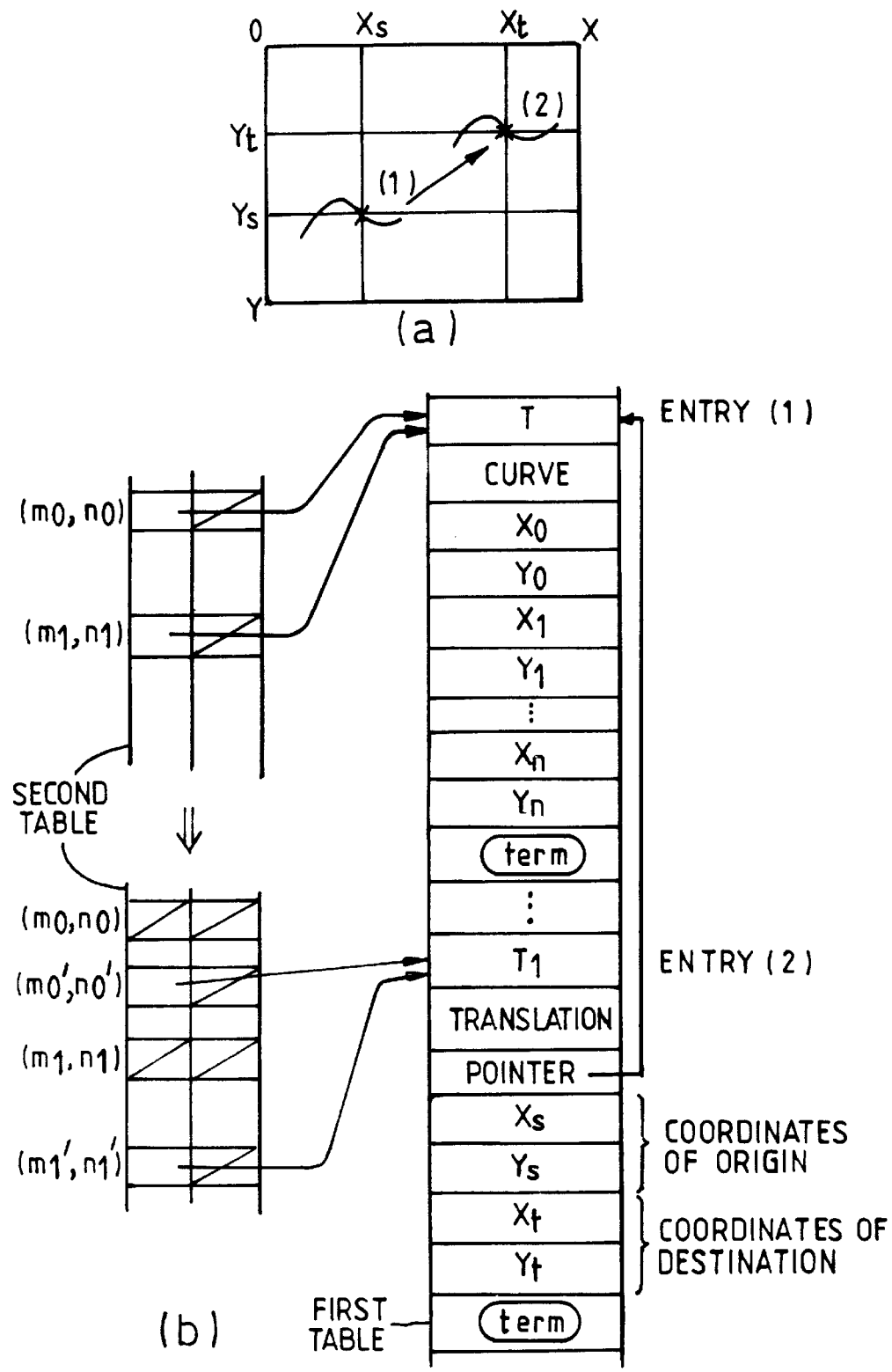
FIGS. 23(a) and (b) and FIGS. 24(a) and (b) illustrate a third embodiment of an apparatus for playing back continuous data according to the present invention.

FIG. 23(a) shows a user's operation in accordance with the third embodiment in which the example of an input event shown in FIG. 3 is moved in translation. As shown in an entry (2) in FIG. 23(b), the time when the input event is moved, a code which signifies a type of input of "translation", a pointer to an entry (1) in which a curve to be moved is stored, coordinates (xs, ys) of the origin of the move and coordinates (xt, yt) of the destination of the move, are written in the first table. As a result, the first table stores information representing the modification that has been performed as an input event.

With this, the second table is updated as follows. The second table is read to locate a pointer from a mesh which corresponds to a point (xs, ys) of the entry. If the pointer is found, nothing moves and the second table is not updated because nothing is drawn on this point. If one pointer is found, it is an input event to be moved. If more than one pointer is found, one of them is selected as an object to be moved. The following policies can be used for the selection: the earliest input, the last input, a user's selection from a plurality of candidates, and the like. A type and coordinates of the input event can be determined from the entry pointed to by the selected pointer.

An example in which an attribute of the entry pointed to by the pointer is "curve" is considered with respect to the third embodiment. Because the "curve" is constructed by a plurality of points in this case, each of them has to be moved in the same direction and distance. That is, with reference to FIG. 23(b), pointers from fields of meshes (m0, n0), (m1, n1), . . . , (mn, nn) which correspond to (x0, y0), (x1, y1), . . . , (xn, yn) in the second table to the entry (1) are deleted and pointers from fields of meshes (m0', n0'), (m1', n1'), . . . , (mn', nn') which correspond to (x0+dx, y0+dy), (x1+dx, y1+dy), . . . (xn+dx, yn+dy) to the entry (2) are added, where, dx=xt−xs, dy=yt−ys. Then a pointer from the entry (2) to the entry (1) is added, assuming a case when a moved figure is deleted or is moved again.

A mechanism for playback is realized in the same manner as in the first embodiment. There are two ways of playing back a part of continuous data.

In one way, the location on the screen specified by a user through the specifying section 6 is given to the second table in the input event storage section 3 first. If the specified location is (m0', n0') or (m1', n1'), the entry (2) in the first table is obtained by following the corresponding pointer. Then the time T1 when the modification of the input event is performed is read out to send to the playback controlling section 7, and a part of the continuous data on and/or around the time T1 is played back.

Figure 24:
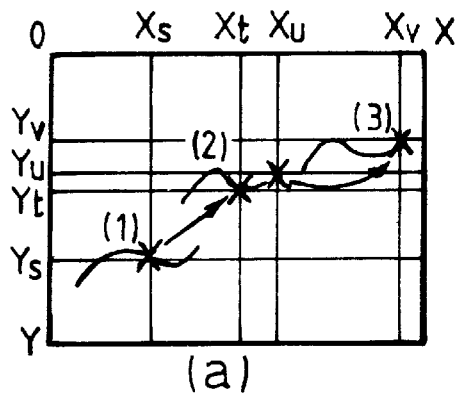
Figure 24:
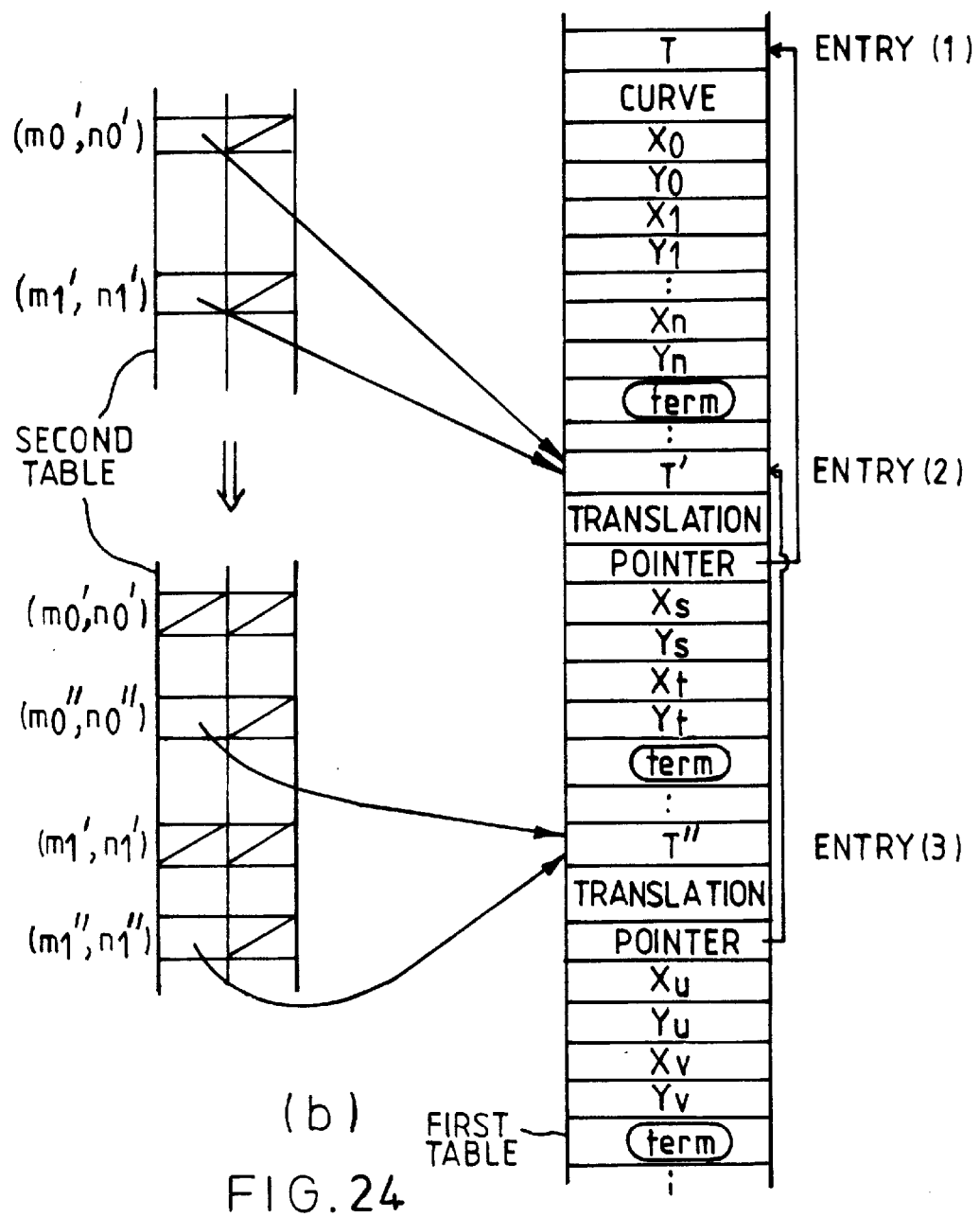

In another way, the entry (1) in the first table is obtained by following the pointer in the entry (2), after the entry (2) is obtained as described above. Then the time T when the original input event is inputted is read out to send to the playback controlling section 7, and a part of the continuous data on and/or around the time T is played back. A user can select whether the part to be played back corresponds to the time T1 or to the time T, by changing ways of the specification through the specifying section 6, for example, clicking a mouse once for the time T1 and twice for the time T. The following processing is performed in the display controlling section 9 in the playback modes shown in FIGS. 14 through 18. The display controlling section 9 obtains the entries according to the order in the first table to redraw input events on the screen, and when it obtains the entry (2), it finds out that its attribute is "translation." Then it follows the pointer in the entry (2) and obtains the entry (1). Because the attribute of the entry (1) is "curve", it erases redrawn points which are described in the entry (1). Next, it adds a distance to each of the coordinates described in the entry (1) to calculate a destination. The distance is calculated from the coordinates entered in the entry (2). Then it draws corresponding points on the screen. Thereby the curve once drawn can be moved in translation in sequential redrawing. FIG. 24(a) shows a case when the curve shown in FIG. 3 is moved in translation as in FIG. 23(a) and the movement is repeated once again. When the curve moves from a point (xu, yu) to (xv, yv) in translation, an entry (3) in FIG. 24(b) is created in the first table. By following a pointer from a mesh location which corresponds to a point (xu, yu) to the entry in the second table, the entry (2) is obtained, and its attribute will be "translation."

In this case, two movements are combined. That is, the entry (1) is obtained by following the pointer from the entry (2), and it is found to be the original figure input because the attribute of the entry (1) is "curve". The first movement entered in the entry (2) is performed to the original figure, and successively the movement recorded in the entry (3) is performed to the figure moved once. Then the final coordinates will be (x0+dx+dx', y0+dy+dy'), (x1+dx+dx', y1+dy+dy'), . . . (xn+dx+dx', yn+dy+dy'), where, dx=xt− xs, dy=yt−ys, dx'=xv−xu and dy'=yv−yu. Then pointers from each of the fields of the meshes (m0', n0'), (m1', n1'), . . . , (mn', nn') which correspond to (x0+dx, y0+dy), (x1+dx, y1+dy), . . . , (xn+dx, yn+dy) in the second table to the entry (2) are deleted and pointers from each of the fields of the meshes (m0", n0"), (m1", n1"), . . . , (mn", nn") which correspond to (x0+dx+dx', y0+dy+dy'), (xl+dx+dx', yl+dy+dy'), . . . (xn+dx+dx', yn+dy+dy') to the entry (3) are added. Further, a pointer from the entry (3) to the entry (2) is added.

A mechanism for playback is realized in the same manner as in the first embodiment. There are two ways of playing back a part of continuous data.

In one way, the location on the screen specified by a user through the specifying section 6 is given to the second table in the input event storage section 3 first. If the specified location is (m0", n0") or (m1", n1"), the entry (3) in the first table is obtained by following the corresponding pointer. Then the time T" when the last modification of the input event is performed is read out to send to the playback controlling section 7, and a part of the continuous data on and/or around the time T" is played back.

In another way, the entry (2) in the first table is obtained by following the pointer in the entry (3), after the entry (3) is obtained as described above. Then the time T' when the first modification is performed is read out to send to the playback controlling section 7, and a part of the continuous data on and/or around the time T' is played back. Further, the entry (1) in the first table is obtained by following the pointer in the entry (2), after the entry (2) is obtained as described above. Then the time T when the original input event is inputted is read out to send to the playback controlling section 7, and a part of the continuous data on and/or around the time T is played back. A user can select whether the part to be played back corresponds to the time T", T' or T, by changing ways of the specification through the specifying section 6, for example, clicking a mouse once for the time T", twice for the time T', and three times for the time T.

The following processing is performed in the playback modes shown in FIGS. 14 through 18. The display controlling section 9 obtains the entries, in order, stored in the first table, to redraw input events on the screen, and when it obtains the entry (3), it determines that its attribute is "translation." Then it follows the pointer of the entry to the destination and obtains the entry (2). It determines that the attribute of the entry (2) is "translation." It obtains the entry (1) by following the pointer of the entry to the destination. Because the attribute of the entry (1) is "curve", it adds a distance of the first movement to each of the coordinates described in the entry (1) to calculate a destination of the first movement. The distance of the first movement can be calculated from the coordinates entered to the entry (2), that is, dx=xt−xs and dy=yt−ys. The display controlling section 9 erases the points whose coordinates are calculated because the points compose the curve presently drawn. Then it adds the distance of the second movement to each of the coordinates corresponding to the destination of the first movement to calculate the destination of the second movement. The distance of the second movement can be calculated from the coordinates entered in the entry (3), that is, dx'= xv−xu and dy'=yv−yu. Then the display controlling section 9 draws calculated points on the screen. Thereby the curve once drawn can be moved in translation plural times in sequential redrawing.

Besides the translation, processes such as rotational move, enlarge, reduce and the described above realized in the same manner as described above. In such cases, only an algorithm of calculation for determining a destination is different. Further, a copy is realized by drawing input events in the destination and leaving input events in the origin.

Further, the input events to be edited can be various types such as a circle, a rectangle, a character string or an object defined beforehand, besides the curve. For example, an equivalent processing is carried out when a plurality of input events are edited in a lump. In this case, a plurality of the input events are defined to be a lump to be edited at one time by the grouping section 10 shown in FIG. 1 and the data of the grouping are stored in the input event storage section 3 for playing back the continuous data corresponding to the modification. In a case when a curve is recognized and construed as a character or a figure by the recognizing section 10, its result of recognition is stored and edited as the input event.

A fourth embodiment of the present invention illustrates another aspect of practicing the present invention. It is possible to realize a process for recording, while linking, input events and continuous data at that time, not only in a stand alone portable machine, but also in a remote conference on workstations connected through a network (so-called groupware).

In this case, an application program for the workstation conference is adapted to receive sound and pictures to inform speaking and expression of participants and circumstances of the conference to other participants, transmitting through the network. Then the sound/pictures received and the sound/pictures transmitted through the network are recorded in the continuous data recording section 1 of FIG. 1. Further, the application program accepts input events inputted by the participants and at the same time, transmits them through the network. Then it stores the input event inputted by the participant in the input event storage section 3 linking with the time data when the participant has inputted the input event and stores it transmitted through the network in the input event storage section 3 linking with the time when it has been transmitted.

In this case, it is convenient for partial playback to store the name of the participant who made the input in the first table, besides the type of the input explained in the first embodiment.

Here, if a server for managing recording continuous data of all the participants and storing the input events within the network is provided, a time when the input event has arrived at the server or a time when the server has transmitted the input event to each client can be linked and stored instead of the time data described above.

By recording in such a manner, a part of the workstation conference can be readily and partially played back when a participant wants to recall the content of the conference, when someone who did not participate wants to know the outline of the conference after the conference, or when all the participants want to return to a previous discussion during the conference.

A memorandum on an imaginary shared board on which a plurality of participants can write during the conference or a memorandum which has been prepared personally by each participant is displayed on the displaying section 8. The manner of displaying can be modified, for example, by changing its color per each participant's identify. Next, the user specifies one of the input events in the memorandum on the screen through the specifying section 6, which was inputted at a time when a discussion to be recalled was made. The playback controlling section 7 provided in a terminal of each person or in the aforementioned server plays back sound/pictures at the corresponding point in time. The playback modes in FIGS. 14 through 18 are also useful.

Further, the user's operation such as read and write is sometimes exclusively controlled in order to share input events consistently in this case. Therefore, it is effective for giving a better understanding of the flow of discussion to enter in the first table data such as a person who locked a part and a time when he/she locked the part, to visualize such data during playback as one type of "invisible" input event explained in FIGS. 4 and 19, and to allow the user to specify such data.

A fifth embodiment shows a further aspect of using the present invention. It is assumed that an electronic writing tool such as a pen which has a memory device to store an accumulation of strokes written on a paper (i.e. input events) is realized. Then, by adding functions of recording continuous data and of storing time data which identifies the time when each writing has been made in the memory of input events to such an electronic writing tool, a system is realized which is capable of playing back a desired part of the recorded continuous data by specifying one of the strokes, as described above.

In the case of this embodiment, the electronic writing tool itself performs the recording step, and after the recording, written strokes, time data and recorded continuous data within the electronic writing tool are transferred to a computer provided with a bitmapped displaying device and continuous data playback device for partially playback.

A sixth embodiment shows another aspect of using the present invention. In this embodiment, audio signals of conversation over telephones is recorded as the continuous data. It is often the case to take notes during a telephone discussion. Such practice leads to effective communication if the corresponding voice is partially played back later with the rough notes.

In accordance with the sixth embodiment, the recording of a voice over the telephone and storing of input events for notes are performed with the mechanism shown in FIG. 2 starting at the point of time when the receiver is picked up and ending at the point of time when the receiver is put back. A desired part of the voice over the telephone is played back with the mechanism in FIG. 8.

Figure 25:
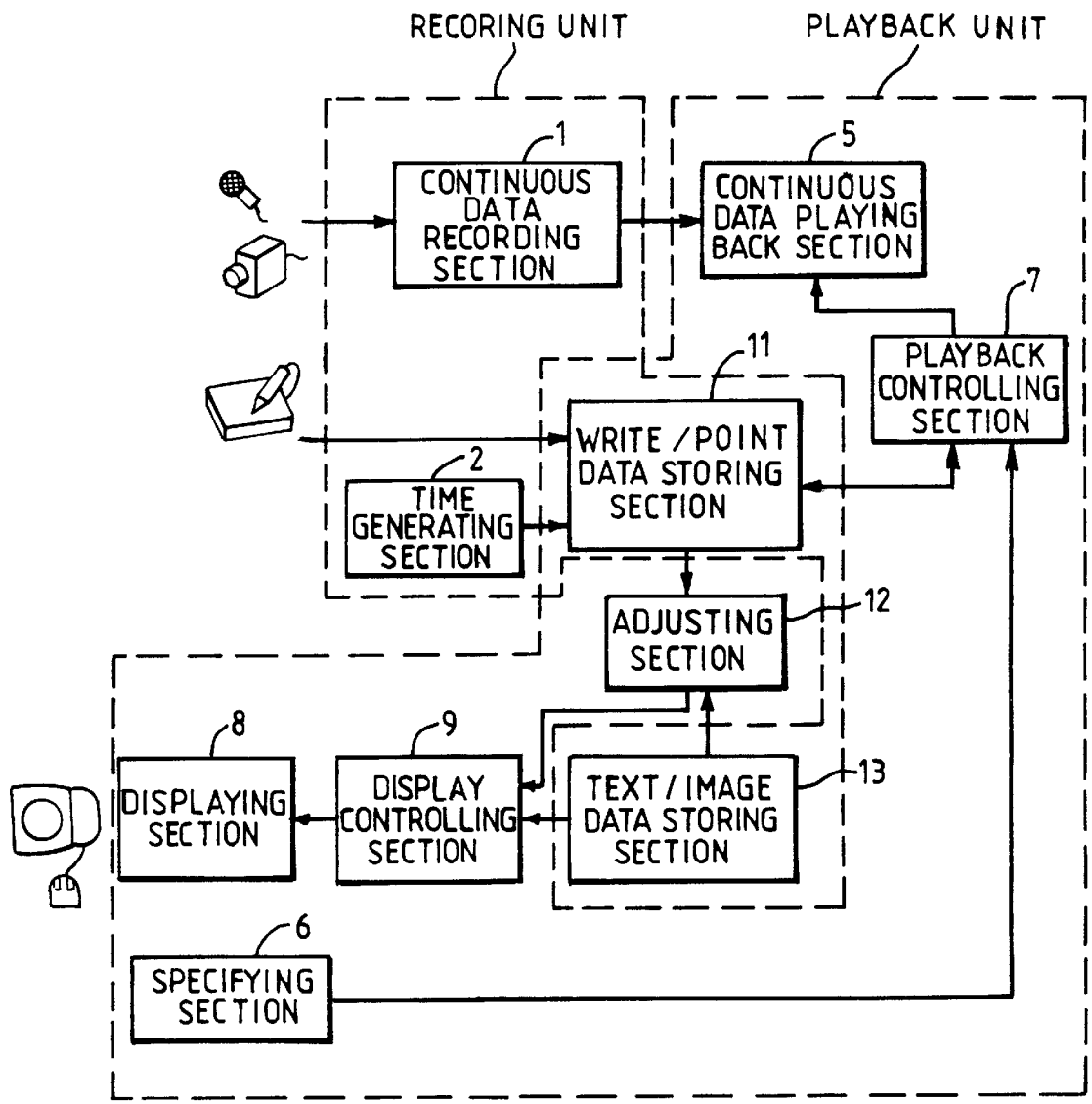
FIG. 25 is a schematic block diagram of a seventh embodiment of an apparatus for playing back continuous data according to the present invention.

In accordance with a seventh embodiment, the present invention is applicable not only to a case when new input events are inputted, but also to a case when writing or pointing to text/image data already prepared or distributed are inputted. FIG. 25 shows the arrangement of this embodiment.

The text/image data already existing are stored in a text/image data storing section 13 and displayed on a screen. A user speaks or moves while writing or pointing on this text/image data by using a pen or the like. The sound/pictures data are recorded by the recording section 1. Concurrently with that, a sequence of coordinate points written or pointed to are stored in a write/point data storing section 11 by linking with the current time generated by the time generating section 2. This is performed in the same manner as it is performed in the first embodiment using the first and second tables.

At the time of playing back, the display controlling section 9 displays the text/image data and write/point data superimposed by an adjusting section 12 on the displaying section 8. The display controlling section 9 visualizes an "invisible" data such as "pointing" in the same manner as in the first embodiment. Then when a user specifies a spot on the screen of the displaying section 8, the playback controlling section 7 retrieves the corresponding time from the write/point data storing section 11 and controls the playing back section 5 so that the sound/pictures data are partially played back based on that time.

Write/point data storing section 11 can be provided as a storing device such as memory, hard disk, optical disk, floppy disk, tape, or the like. Adjusting section 12 can be provided as software which adjusts text/image data stored in text/image data storing section 13 to corresponding data stored in write/point data storing section 11 when it loads them. Text/image data storing section 13 can be provided as a storing device such as memory, hard disk, optical disk, floppy disk, tape, or the like.

Figure 26:
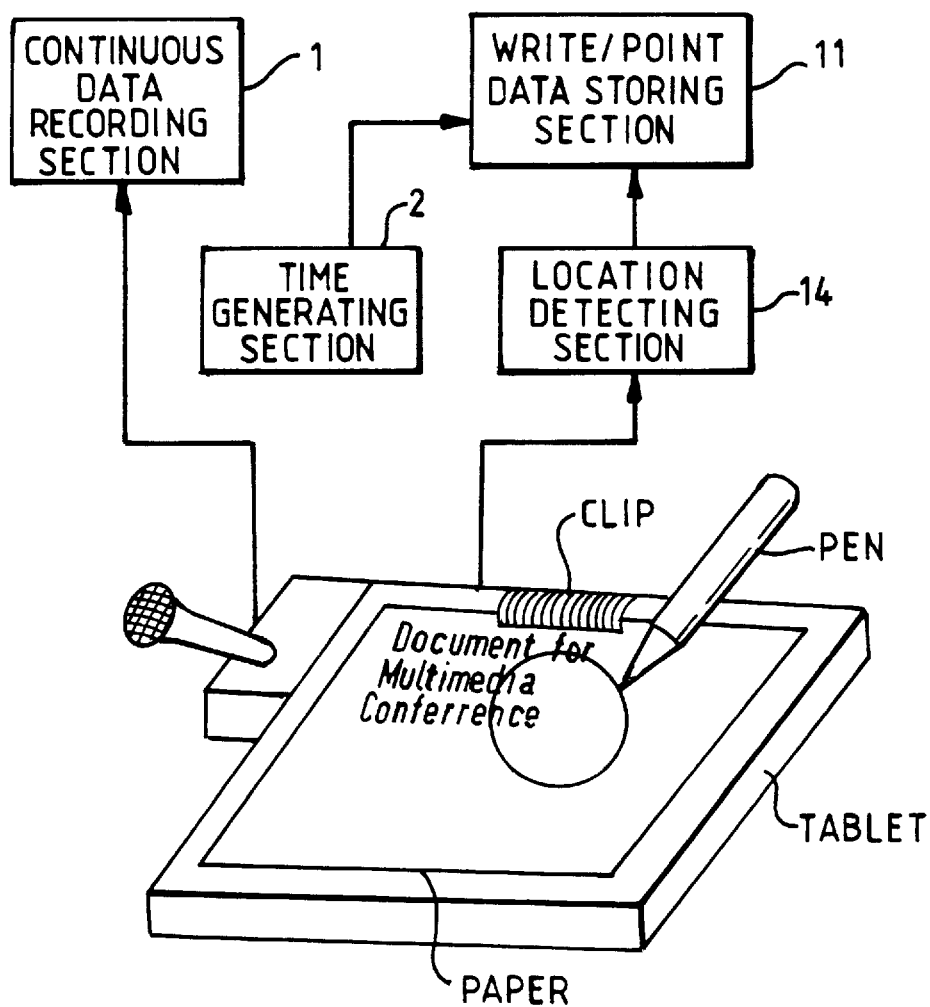
FIG. 26 is a partial diagram in a case when another medium is used by overlaying on a tablet for inputting input events.

The present invention can be practiced not only in the case wherein the user inputs or specifies input events directly through a computer display, but also in the case wherein the user inputs or specifies them on a medium like a piece of paper. FIG. 26 shows an arrangement adopted when the text/image data prepared beforehand First, the paper is placed on a tablet and a pen is moved while pressed on a paper in the same manner as on a paper without a tablet. The pen can be set in a writing mode in which its stroke is left on the paper, and can be set in a pointing or playback mode in which the stroke is just selected.

This tablet comprises a surface including a location detecting section 14 for detecting coordinate points pressed by the pen over the paper. The data stored in the write/point data storing section 11 of FIG. 25 is created by combining this sequence of coordinate points and the time generated in the time generating section 2. Further, a voice is continuously recorded, for example from a microphone on the tablet.

In playing back the voice data, this paper is overlaid on the same position and written or traced locations are specified by a pen. Then, the entry in the first table corresponding to the mesh location specified by the pen is retrieved from the second table. The entry has the corresponding time and a part of the sound data recorded at the time is played back. In this case, the sections 8, 9, 12 and 13 of FIG. 25 are not necessary.

It is preferable to additionally provide a clip for holding the paper so that it does not get out of position at the times of recording and of playing back. It is possible to deal with a slight shift by setting up the pointers from a certain degree of wide mesh locations to the entry of the write/point data.

The present embodiment is applicable also to a case when a paper on which no text/image data exist beforehand is placed on the tablet. Further, the tablet of the present embodiment can be used also as the displaying section 8 in the first embodiment when a transparent medium such as an overhead projector sheet is used instead of paper.

An eighth embodiment of the present invention shows a case when a position in the storage means in which the continuous data are stored (i.e. a storage address) is used instead of the time data in the aforementioned embodiments.

Figure 27:
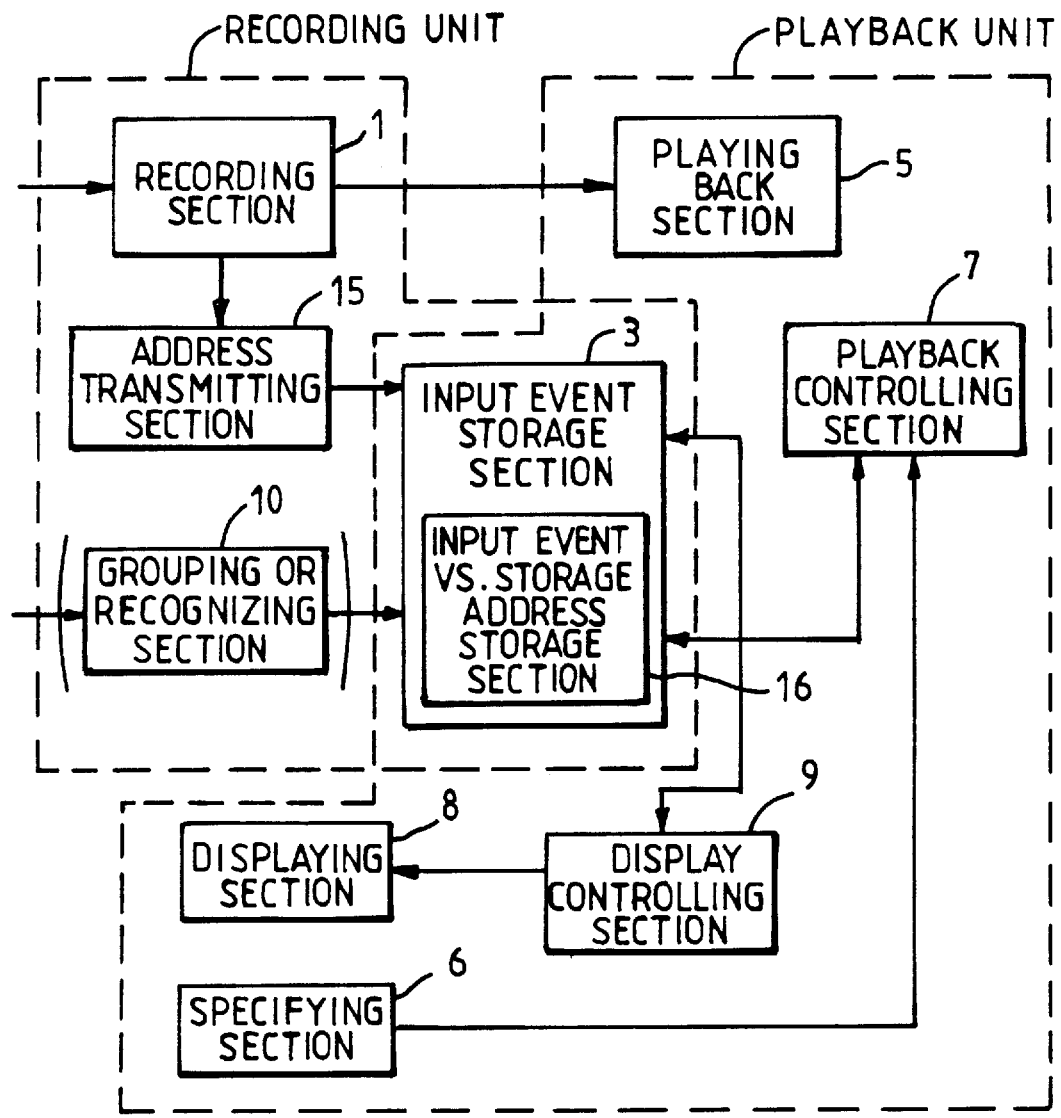
FIG. 27 is a schematic block diagram of an eighth embodiment of an apparatus for playing back continuous data according to the present invention.

FIG. 27 shows an arrangement in accordance with the eighth embodiment, which corresponds to FIG. 1. An input event and a storage address of the continuous data recorded when the input event is inputted are stored and linked with each other. The storage address of the continuous data is read by the continuous data recording section 1, and is transmitted to the input event storage section 3 by an address transmitting section 15. It is linked with the input event inputted then, and is stored in an input event vs. storage address storage section 16. When a user requests to play back a part of the continuous data by specifying one of the input events through the specifying section 6, the playback controlling section 7 retrieves the corresponding part of the continuous data from the section 16. The storage address is used to identify the part of the continuous data to be played back.

Address transmission section 15 can be provided as software which reads and transmits a storage location in which continuous data is being recorded.

Figure 28:
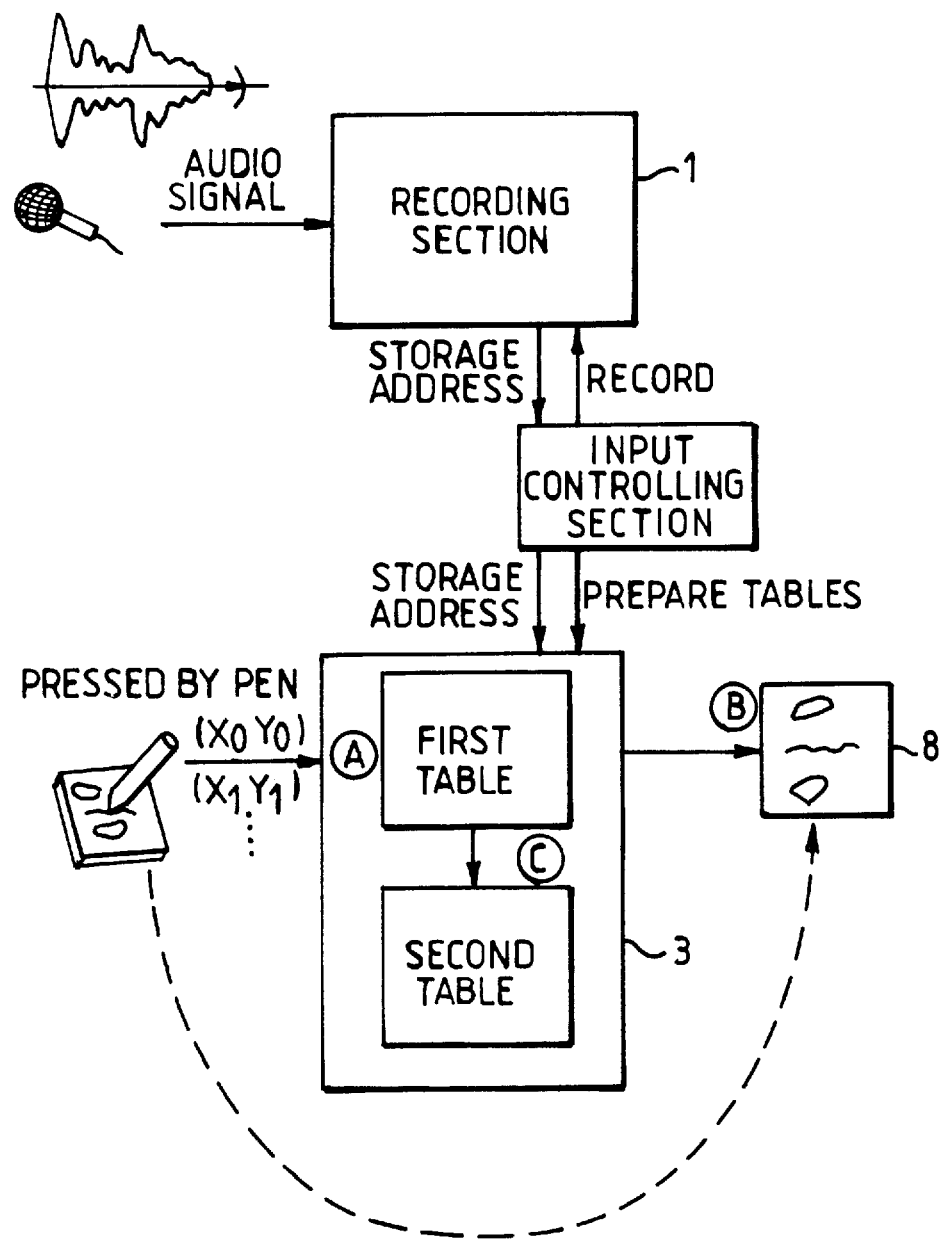
FIG. 28 is an illustrative diagram showing an operation at the time of recording of the apparatus of FIG. 27.

FIG. 28 shows the operation of the system in the eighth embodiment during recording, and corresponds to FIG. 2. A storage address, for example an address in FIG. 9, is transmitted from the recording section 1 to the first table to be stored therein (operation A). The succeeding process is the same as that previously described with reference to FIG. 2.

Figure 29:
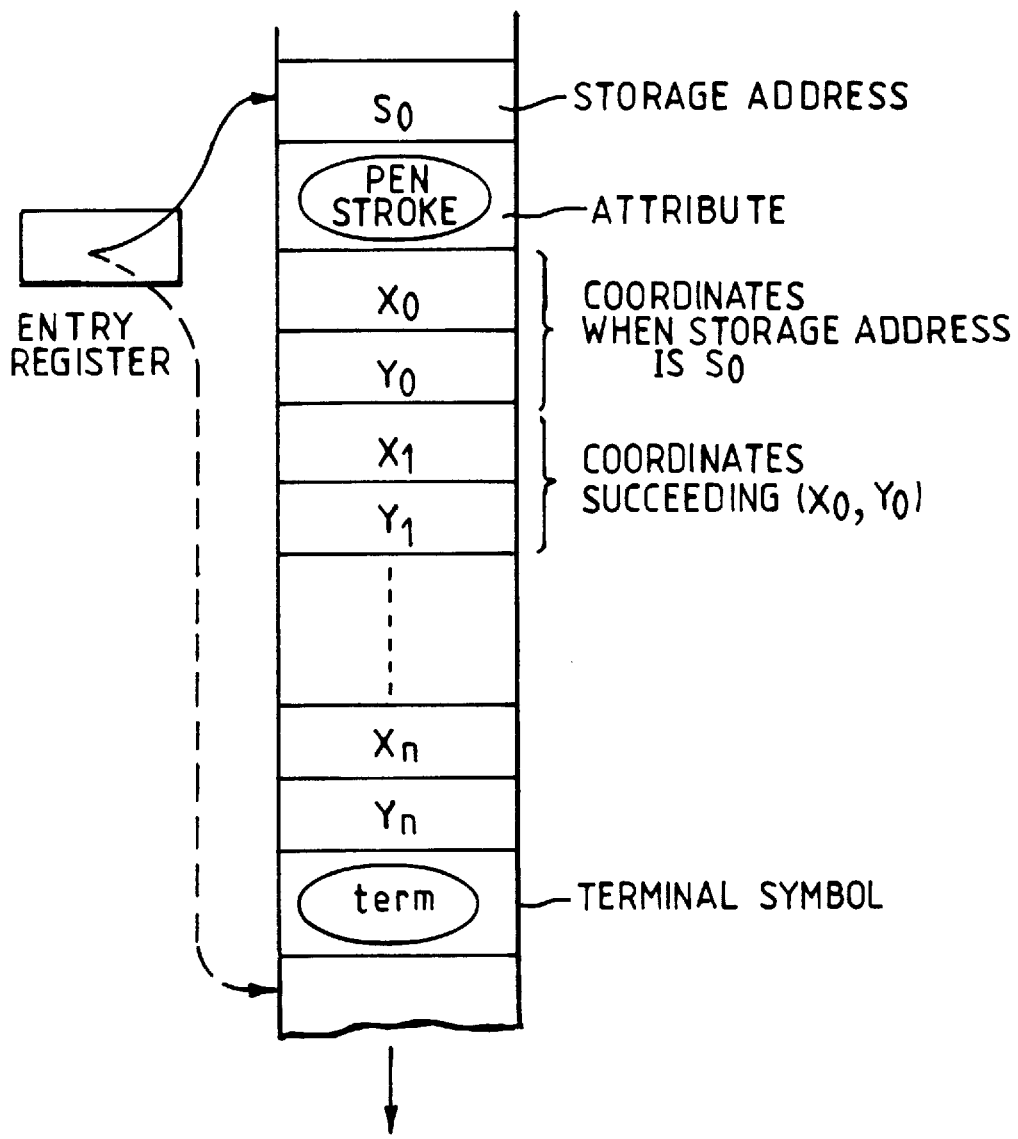
FIG. 29 illustrate an exemplary configuration of the first table used in the apparatus of FIG. 27.

FIG. 29 is an example showing a content of the first table for linking input events with storage addresses of the eighth embodiment, and corresponds to FIG. 3. Instead of the time T when the input event is input, the position in the storage S0 of the signal recorded when the input event is input is stored in the first table. The first tables for linking input events with time data in all the drawings described above are replaced with tables for linking input events with storage addresses in the eighth embodiment.

Figure 30:
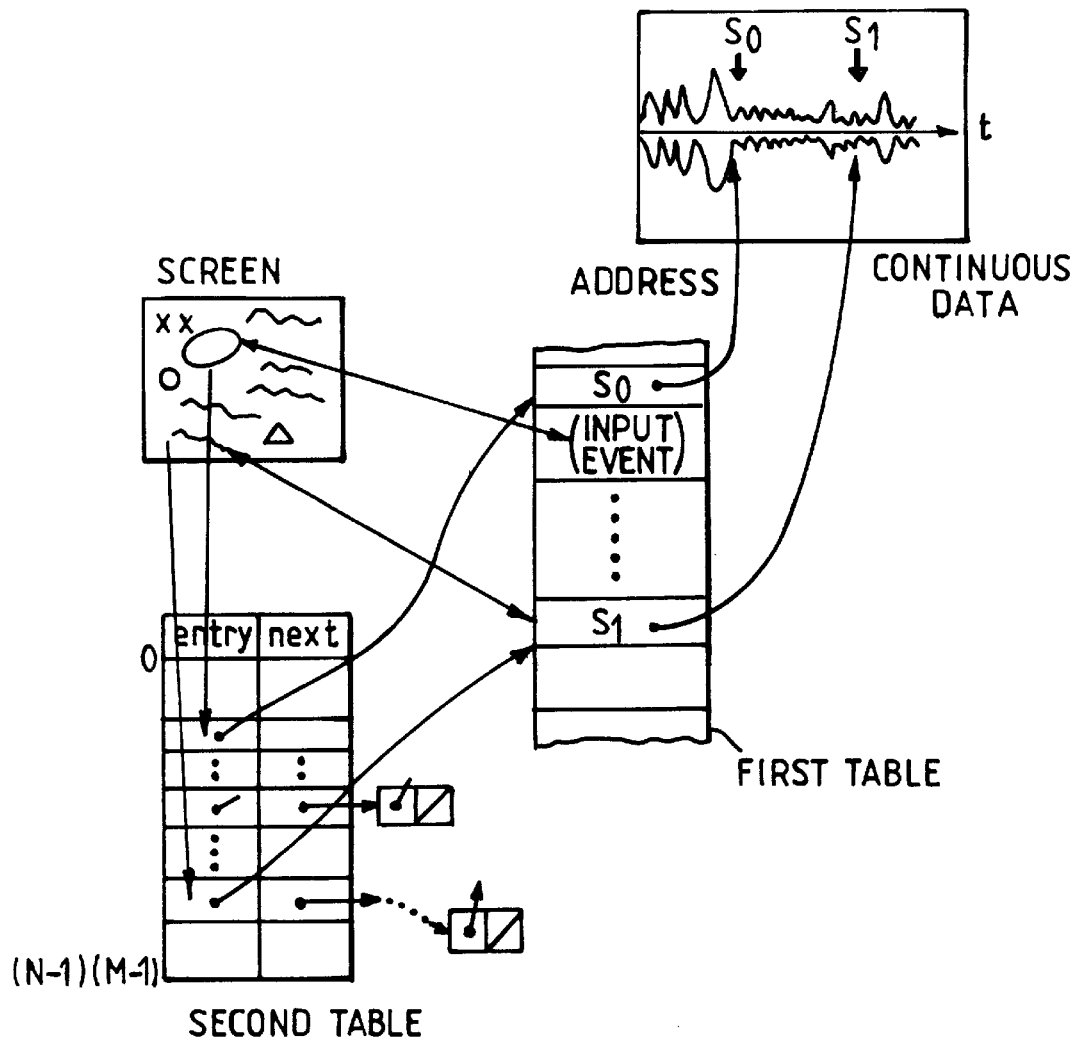
FIG. 30 illustrates a relationship among the display, the first and second tables and a time axis of the continuous data in FIG. 27 and 28.

FIG. 30 shows a relationship among the first and second tables, locations on the screen, and recorded continuous data of the present embodiment, and corresponds to FIG. 7. An appropriate part of the recorded data is retrieved and played referring to the storage address stored in the first table.

Figure 31:
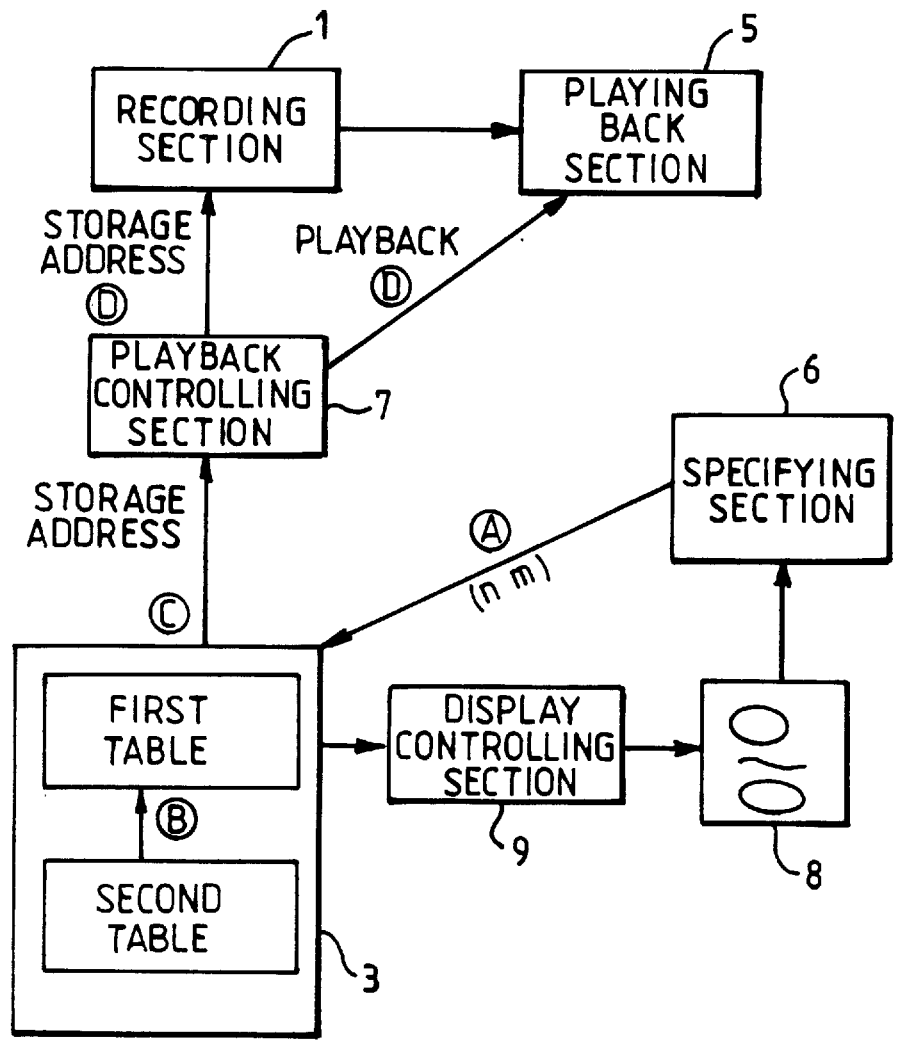
FIG. 31 is an illustrative diagram showing an operation at the time of playback of the apparatus of FIG. 27.

FIG. 31 shows the operation of the system in the eighth embodiment during playback, and corresponds to FIG. 8(a). The operation is substantially the same as described with respect to FIG. 8(a), except that in the eighth embodiment, instead of time, the storage address is passed in the (operation C) and (operation D).

A ninth embodiment of the present invention can be practiced in a case wherein either an audio or video signal is provided as continuous data that change with time to be linked with the input event, but also in a case when both the audio and video signals are provided.

Figure 32:
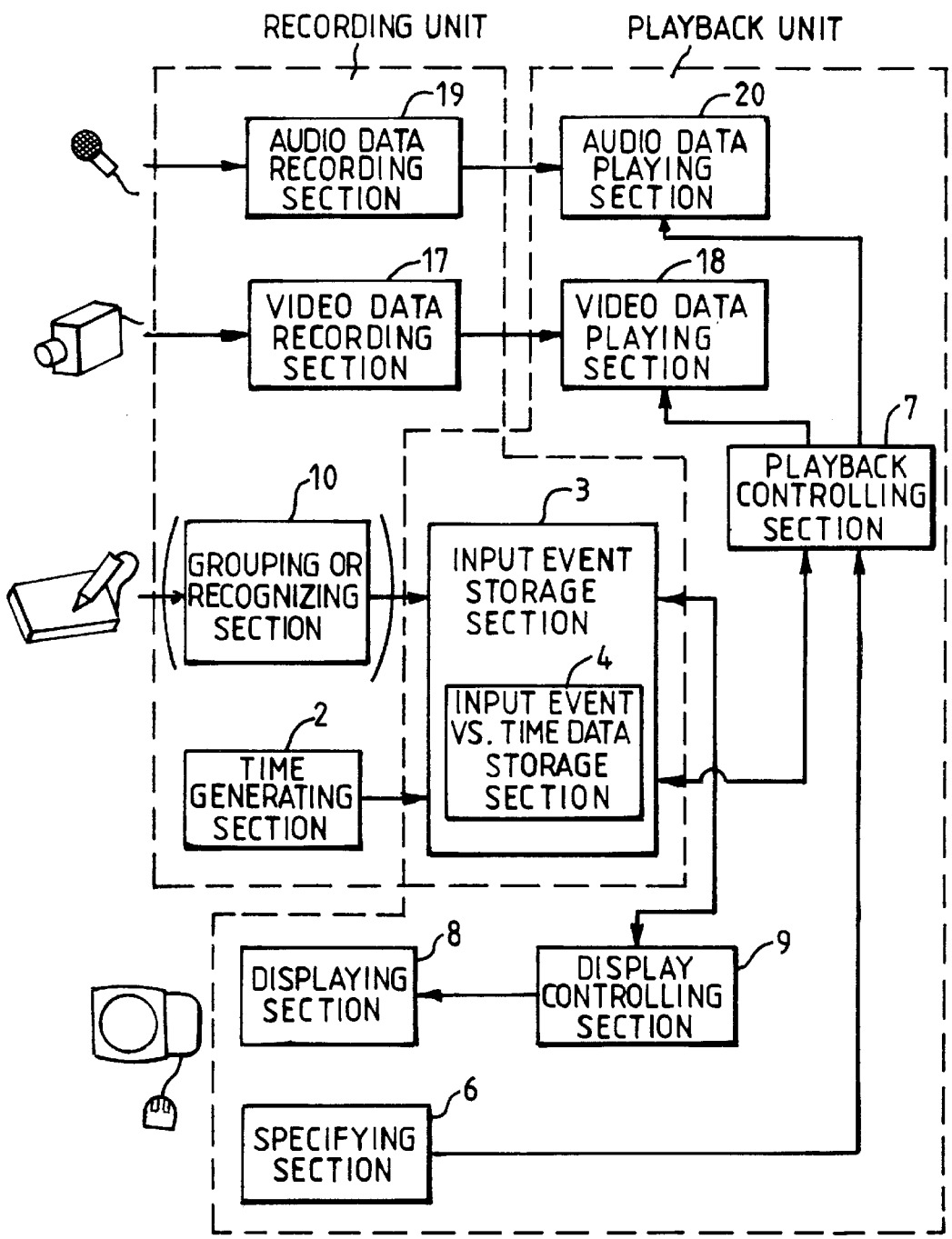
FIG. 32 is a schematic block diagram of a ninth embodiment of an apparatus for playing back continuous data according to the present invention.

FIG. 32 shows an arrangement in accordance with the ninth embodiment which is applied to plural series of continuous data. A video data recording section 17 records one series of data such as video data and an audio data recording section 19 records another series such as audio data. When a spot is specified on the screen by the specifying section 6, the playback controlling section 7 commands a video data playing section 18 and an audio data playing section 20 to play back a corresponding part of video and audio data, respectively.

It is also possible to perform a partial playback of plural series of continuous data by linking each of them with the time data or the storage addresses, even if plural video data and plural audio data exist, or even if only either kind of data exists plurally. For example, in a case when there are a plurality of participants in a conference, it is effective to record voice/pictures separately per each participant.

Video data recording section 17 and audio data recording section 19 can be provided as a storing device such as memory, hard disk, optical disk, floppy disk, tape, or the like. Video data playing section 18 can be provided as a camera or the like. Audio data playing section 20 can be provided as a speaker or the like.

Figure 33:
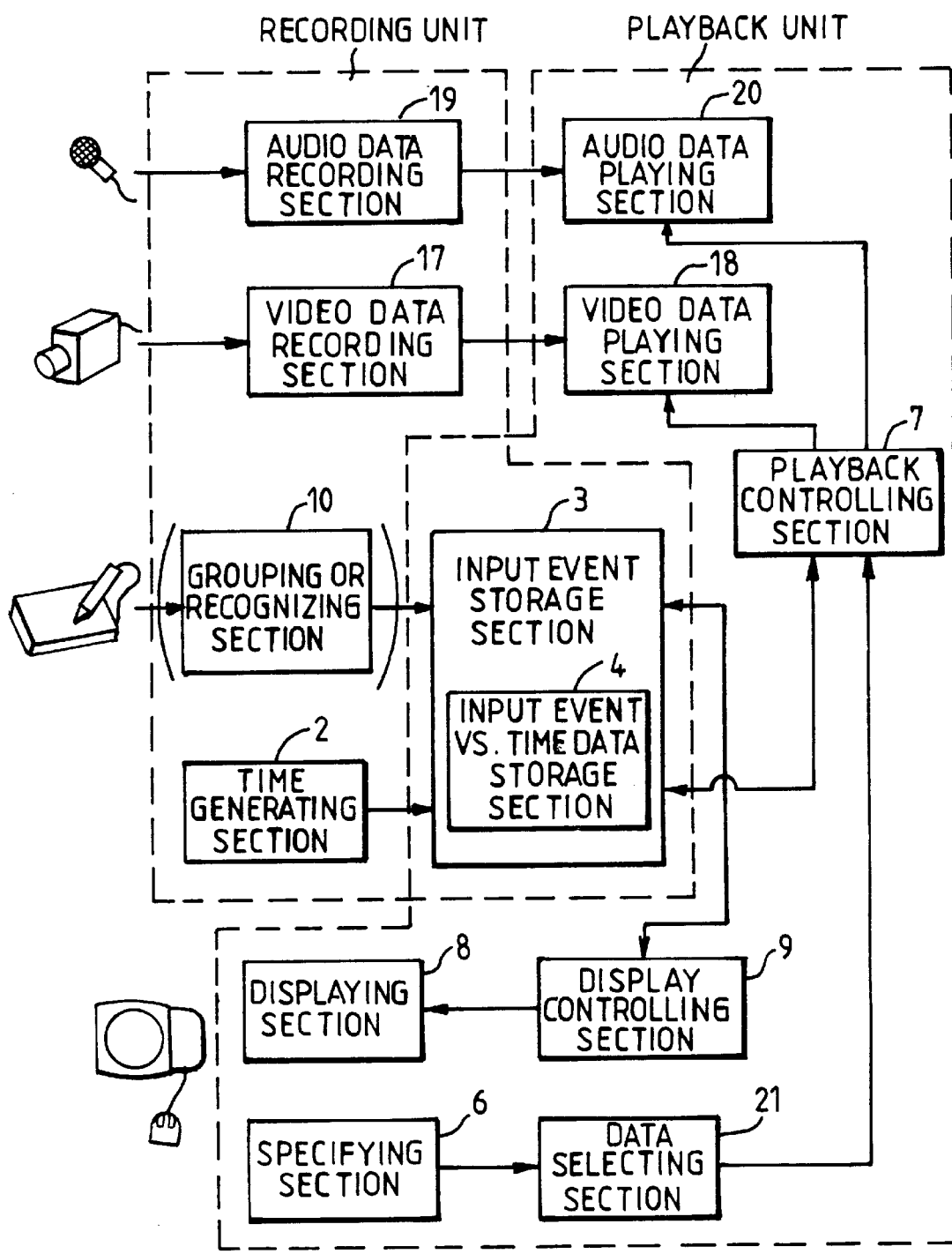
FIG. 33 is a schematic block diagram of a modified version of the ninth embodiment.

Further, it is convenient that one or several series of continuous data among the plurality of series are selectively played back in accordance with a purpose. FIG. 33 shows an example of an arrangement for such a case. The arrangement of FIG. 33 is substantially the same as in FIG. 32 except for providing the additional capability of selectively playing back.

With reference to FIG. 33, either audio or video data are selected as a series of data to be played back by a data selecting section 21 during playback. This selection is made based on a request of a user, a program, or the like. This selection can be made during recording, by storing the storage address only of the selected series of data to be linked with an input event. The playback controlling section 7 controls the playing section 18 or 20 to play a part of the series of data, which is identified based on the time data or the storage address corresponding to the specified input event, and the series selected by the data selecting section 21.

Data selecting section 21 can be provided as software which selects some of the continuous data streams so that they are played back.

A tenth embodiment of the present invention is not confined only to a case when the whole of continuous data which changes with time is recorded, but includes a case of recording only a limited part in continuous data to save memory space.

Figure 34:
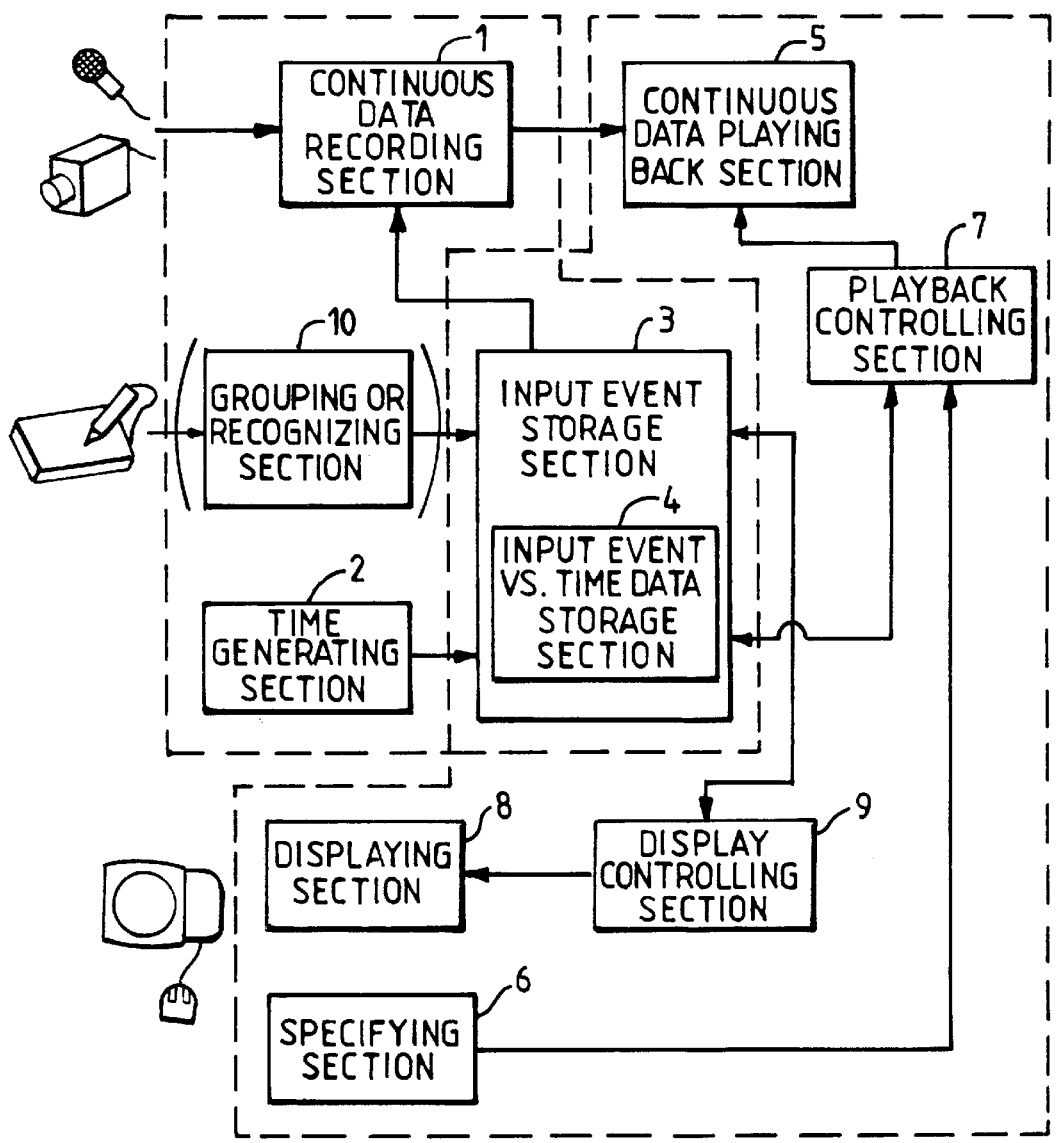
FIG. 34 is a schematic block diagram of a tenth embodiment of an apparatus for playing back continuous data according to the present invention.

FIG. 34 shows an arrangement for recording continuous data in only a limited period while the input event is inputted and before/after that. The arrangement in FIG. 34 is substantially the same as in FIG. 1 except for providing the additional capability of recording limited parts of the continuous data. With reference to FIG. 34, when the input event is inputted, it is stored in the input event storage section 3. The time data when the input is made is transmitted to the continuous data recording section 1 and a part to be recorded is determined depending on the time data.

Figure 35:
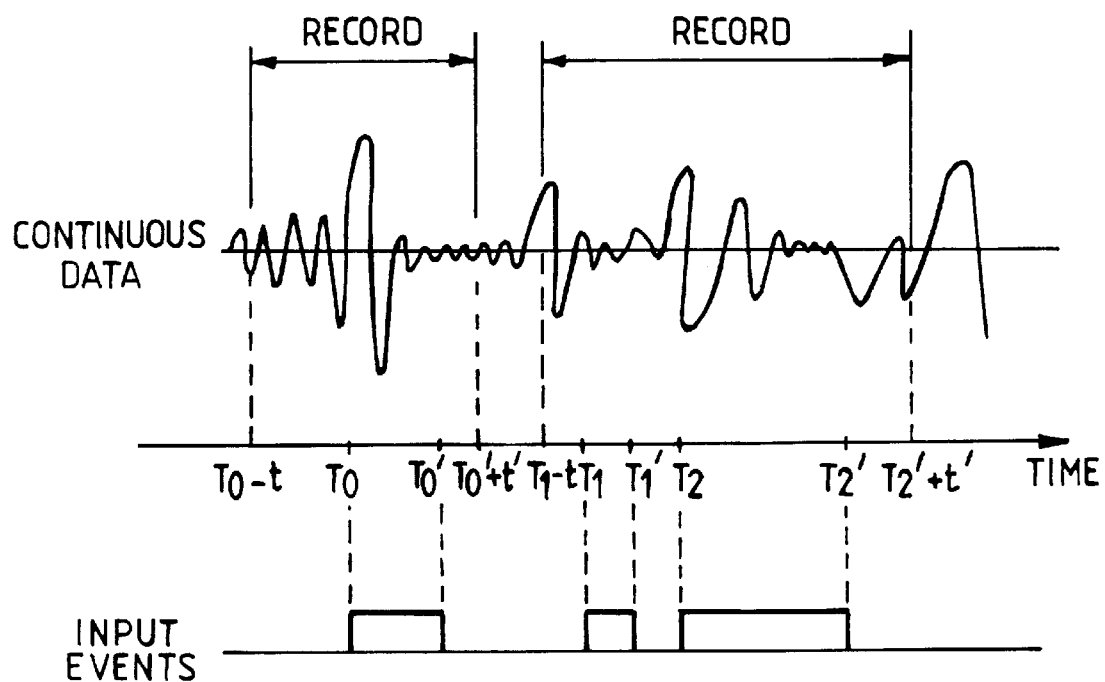
FIG. 35 illustrates an operation of recording continuous data partially.

FIG. 35 shows an example of parts to be recorded in the continuous data recording section 1 of FIG. 34. It is assumed that input events are inputted in time zones [T0, T0'], [T1, T1'] and [T2, T2'] in this example. The terminology [a, b] represents a time zone beginning at time a and ending at time b. Time zones in which the sound/picture is recorded are [T0−t, T0'+t'], [T1−t, T1'+t'] and [T2−t, T2'+t'], if recording sound/pictures data starts at time t earlier before the input starts and recording stops at time t' later than it ends. The time zones are linked to be [T(i)−t, T(i+1)'+t'], when they overlap each other (i.e. T(i+1)−t<=T(i)'+t'). In this figure, the time zones become [T0−t, T0'+t'] and [T1−t, T2'+t'], because the time zone relating to T1 and that to T2 are overlapped. The time data and the time zone explained above can be replaced by addresses in the storage of the continuous data.

In order to realize the recording of sound/pictures from the previous time before an input starts, the following process can be performed. A buffer for inputting continuous data is provided separately from the recording section 1 and the data are recorded in this buffer in a normal mode. Then at a point of time T0 when inputting an event commences, the continuous data from T0−t to T0 are copied from the buffer to the recording section 1. The continuous data are recorded in the recording section 1 directly until time elapses by t' after the input is interrupted. After that, recording is switched to the normal mode and the same process is repeated. Alternatively, it is possible to record the continuous data in the time zone [T0−t, T0'+t'] into the buffer and to copy them to the recording section 1 altogether. The continuous data in the buffer are overwritten when it is not likely to be copied to the recording section 1.

Figure 8:
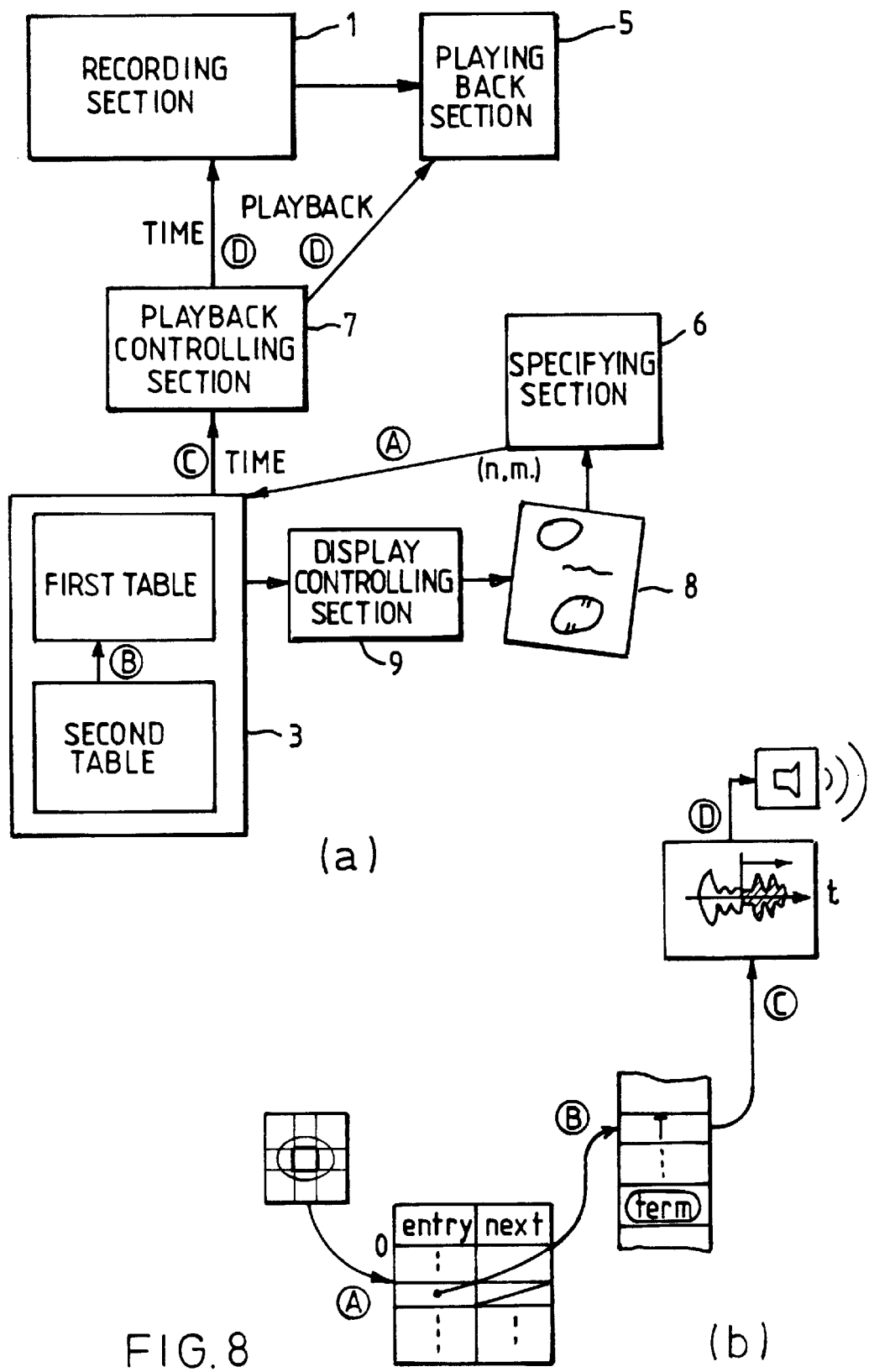
FIGS. 8(a) and (b) are illustrative diagrams showing an operation at the time of playback of the apparatus of FIG. 1.

According to the present embodiment, the part of the continuous data which can be played back by the mechanism in FIG. 8 is limited to the recorded part. However, this limitation does not lose the effectiveness for the practical use, because it is often the case that a user takes a memo or inputs a pointing before/after important talks in a conference.

An eleventh embodiment of the present invention can be practiced also in a case when a user makes an input to a computer while playing the sound/pictures data already stored in a storage medium. In this embodiment, playing continuous data and inputting input events are carried out simultaneously, while recording is carried out concurrently with inputting in the abovementioned embodiments. A user hears or watches the sound/pictures data already stored while taking notes, and after that one can readily play back a desired part of the sound/pictures data once played.

Figure 36:
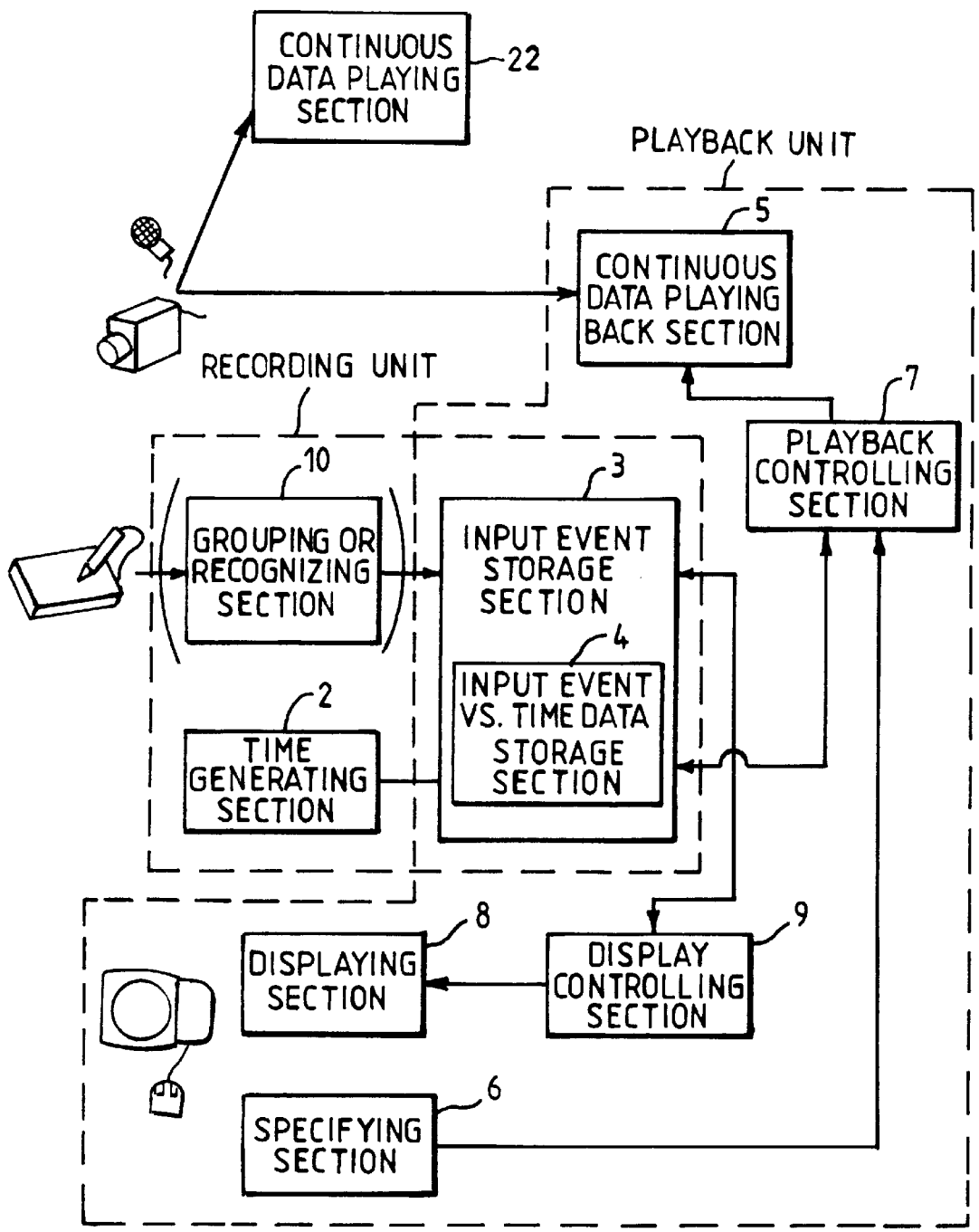
FIG. 36 is a schematic block diagram of an eleventh embodiment of an apparatus for playing back continuous data according to the present invention.

FIG. 36 shows an arrangement in accordance with the eleventh embodiment. The system is similar to the arrangement in FIG. 1, except that it comprises a continuous data playing section 22 instead of the continuous data recording section 1. The playing section 22 plays the continuous data already stored in the storage medium in a general manner. Concurrently with that, a user makes an input in the same manner as in the first embodiment. This input is stored in the input event storage section 3 and the input event vs. time data storage section 4 is created. The time data in this case are the time from the start of playing in the playing section 22.

During playback, the continuous data playing back section 5 plays back a part of the continuous data in the same manner as that played in advance by the playing section 22. The part is specified based on the data stored in the input event vs. time data storage section 4 in the same manner as in the first embodiment. Here, the input event vs. storage address storage section 16 (FIG. 27) can be used instead of the section 4.

In this case, the initial value used in the playing back section 5 is set to agree with the starting address of playing by the playing section 22, because the starting point of the time data stored in the section 4 corresponds to that starting address. This is done by the playing section 22 transmitting the starting address to be stored in the input event storage section 3 in recording, and the playback controlling section 7 reading out the stored starting address to be set as the initial value of the playing back section 23. The address transmitting section 15 can be used for this transmission. Alternatively, a user can manually set the starting address.

Continuous data playing section 22 can be provided as a speaker or the like if continuous data is audio. It can be provided as a camera or the like if continuous data is video.

It is possible to implement the first through eleventh embodiments in a manner besides those specified in the description of each embodiments, for example by appropriately combining them. Further, numerous modifications and variations of the present invention are possible in light of the above teachings. It is therefore to be understood that, within the scope of the appended claims, the present invention can be practiced in a manner other than as specifically described herein.

We claim:

1. An apparatus for playing back continuous data, comprising:

first storage means for storing first data including a continuous sequence of data;

second storage means for storing second data including a plurality of input events occurring at arbitrary times during one of the storing and playing of the continuous data sequence;

third storage means for storing third data corresponding to each of the input events, the third data being representative of addresses in the first storage means of locations in the continuous data sequence respectively corresponding to the input events;

fourth storage means for storing fourth data including text and/or image data;

displaying means for selectively displaying the input events stored in the second storage means superimposed over text and/or image data stored in the fourth means;

specifying means for specifying one of the input events displayed by the displaying means superimposed over said text and/or image data; and playback means, responsive to the specifying means, for playing back a selected portion of the continuous data stored in the first storage means in accordance with the third data corresponding to the input event specified through the specifying means so that the selected portion of the continuous data is played back during display of the specified input event superimposed over said text and/or image data, whereby there is provided a user ability to associate text and/or image data with the specified input event superimposed thereover with the selected portion of said continuous data played back.

2. The apparatus according to claim 1, further comprising:
fifth storage means for storing fifth data for linking a location on the displaying means and each of the input events; and wherein the specifying means includes means for specifying one of the input events by retrieving fifth data from the fifth storage means based on the location specified on the displaying means.

3. The apparatus according to claim 1, further comprising:
fifth storage means for storing fifth data for linking selected locations on the displaying means and second data representative of ones of the input events displayed on the displaying means; and wherein the specifying means includes means for retrieving the fifth data corresponding to the location specified on the displaying means and for specifying one of the displayed input events based on the retrieved fifth data.

4. The apparatus according to claim 1, further comprising:
fifth storage means for storing fifth data for linking a selected location on the displaying means and second data corresponding to a plurality of the input events; and wherein the specifying means includes:

means for specifying a location on the displaying means;

means for retrieving the fifth data corresponding to the location specified on the displaying means;

means for displaying on the displaying means the plurality of the input events corresponding to the fifth data retrieved by the retrieving means; and means, included in the specifying means, for specifying one of the plurality of the input events displayed on the displaying means.

5. The apparatus according to claim 1, wherein the third data is time data corresponding to each of the input events.

6. The apparatus according to claim 1, wherein the third data includes addresses in the first storage means corresponding to the locations in the continuous data sequence respectively corresponding to the input events.

7. The apparatus according to claim 1, wherein the first data is representative of audio information.

8. The apparatus according to claim 1, wherein the first data is representative of video information.

9. The apparatus according to claim 1, wherein the input events include events not visibly displayable, the apparatus further comprising display controlling means for displaying a predetermined mark on the displaying means representative of one of the not visible displayable input events; and wherein the specifying means includes means for specifying one of the input events by specifying means includes means for specifying one of the input events by specifying the predetermined mark displayed by the display controlling means.

10. The apparatus according to claim 1, further comprising display controlling means for displaying the input events in a time sequence corresponding to an original sequence of occurrence of the input events; and wherein the specifying means includes means for specifying one of the displayed input events in the sequence of input events.

11. The apparatus according to claim 1, wherein the playback means includes means for playing back a predetermined portion of the continuous data, the predetermined portion of the continuous data being played back for a predetermined period including the continuous data stored in at least one of a forward and rearward portion of the first storage means relative to the address corresponding to the third data.

12. The apparatus according to claim 1, wherein the second storage means includes means for storing the specification of one of the input events made through the specifying means as an input event, and the first storage means includes means for storing continuous data including the continuous data played back by the playback means.

13. The apparatus according to claim 1, wherein the continuous data stored in the first storage means comprises a plural series of continuous data, the third data stored in the third storage means permitting identifying an address in the first storage means of at least one series of the continuous data, and the playback means includes means for playing back a selected portion of at least one series of the continuous data corresponding to the third data.

14. The apparatus according to claim 1, wherein the first storage means includes means for storing as the first data portions of the continuous sequence of data, each portion inputted for a predetermined period defined based in part on a duration of the input event.

15. The method for playing back continuous data, comprising the steps of:
storing text and/or image data;
sequentially inputting and storing continuous data;
storing, during storing of the continuous data, a plurality of input events occurring associated with at least one of the text and/or image data and the continuous data at arbitrary times during inputting and storing the continuous data and data representative of storage addresses of the continuous data which has been inputted corresponding to the input events;
displaying the stored input events superimposed over the stored text and/or image data;
specifying one of the displayed input events superimposed over the stored text and/or image data; and
playing back a selected portion of the stored continuous data in according with the data representative of storage addresses which corresponds to the specified input events that the selected continuous data is played back during display of the specified input event superimposed over said text and/or image data, whereby there is provided a user ability to associate text and/or image data with the specified input event superimposed thereover with the selected portion of said continuous data played back.

16. The method according claim 15, further comprising the steps of:
displaying the input events on a first display concurrently with the input events storing step; and
displaying the stored input events on a second display, which is the same display or same type display as the first display, prior to the specifying step; and wherein the input events storing step includes a step of storing data for linking a location on the first display and each input event, and the specifying step includes a step of specifying one of the input events based on the stored linking data and a location specified on the second display.

17. The method according to claim 15, further comprising the steps of:
displaying the input events on a first display concurrently with the input events storing step;
storing data for linking a location on the first display and each input event concurrently with the input events storing step;
displaying prior to the specifying step the stored input events on a second display; and
converting, prior to the specifying step, the stored linking data into data linking a location on the second display and each input event; and wherein the specifying step includes a step of specifying one of the input events based on the converted linking data and a location specified on the second display.

18. The method according to claim 15, wherein the input events storing step comprises the steps of:
detecting a type of each input event inputted; and
storing a plurality of input events, each input event including data for signifying the detected type.

19. The method according to claim 15, further comprising the step of performing a grouping process for defining a block of input events to be linked with data representative of a storage address; and wherein the input events storing step stores the block of input events as one input event.

20. The method according to claim 15, further comprising the step of performing a recognition process for converting input events into coded data; and wherein the input events storing step includes a step of storing the coded data as input events.

21. The method according to claim 15, further comprising the step of editing the stored input events; and wherein the input events storing step includes steps of storing data representing a current version of the input event, and storing data permitting identifying a storage address of the continuous data which has been inputted when the current version was created.

22. The method according to claim 15, further comprising the step of editing the stored input events; and wherein the input events storing step includes steps of storing data representing a original version of the input event, and storing data permitting identifying a storage address of the continuous data which has been inputted when the original input event was inputted.

23. The method according to claim 15, further comprising the step of inputting a plurality of input events prior to the input events storing step, including a step of using a location detecting device having a surface for detecting locations pointed out on the surface, and wherein the input events storing step includes a step of storing the locations detected in the inputting step as the input events, and the specifying step includes a step of specifying one of the input events based on the location specified by using the location detecting device.

24. A method for playing back selected portions of continuous data previously sequentially inputted and stored, comprising the steps of:

storing text and/or image data;

a first playback step including playing continuous data stored previously;

storing, during the first playback step, a plurality of input events occurring at arbitrary times and data representative of storage addresses of the continuous data which has been played corresponding to the input events;

displaying the stored input events superimposed over the stored text and/or image data;

specifying one of the displayed input events superimposed over said text and/or image data; and a second playback step including playing back a selected portion of the stored continuous data in accordance with the data representative of storage addresses which correspond to the specified input event so that the selected continuous data is played back during display of the specified input event superimposed over said text and/or image data, whereby there is provided a user ability to associate text and/or image data with the specified input event superimposed thereover with the selected portion of said continuous data played back.

* * * * *